US012613592B2

(12) United States Patent
Lee et al.

(10) Patent No.: US 12,613,592 B2
(45) Date of Patent: Apr. 28, 2026

(54) LIGHT EMITTING DIODE DISPLAY DEVICE WITH BUILT-IN TOUCH SENSOR

(71) Applicant: LG Display Co., Ltd., Seoul (KR)

(72) Inventors: HwiDeuk Lee, Paju-si (KR);
ByungHyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/936,929

(22) Filed: Nov. 4, 2024

(65) Prior Publication Data

US 2025/0165092 A1      May 22, 2025

(30) Foreign Application Priority Data

Nov. 20, 2023      (KR) ......................... 10-2023-0161221

(51) Int. Cl.
*G06F 3/041* (2006.01)
(52) U.S. Cl.
CPC .................... *G06F 3/04164* (2019.05); *G06F 2203/04107* (2013.01)
(58) Field of Classification Search
CPC .................. G06F 3/04164; G06F 2203/04107
See application file for complete search history.

(56) References Cited

U.S. PATENT DOCUMENTS

2016/0218324 A1* 7/2016 Kim ...................... H10K 59/131
2018/0004017 A1* 1/2018 Hatsumi ............... G02F 1/0045
2021/0405797 A1* 12/2021 Bae ........................ G06F 3/0412
2022/0028933 A1* 1/2022 He ......................... H10K 59/40

* cited by examiner

*Primary Examiner* — Afroza Chowdhury
(74) *Attorney, Agent, or Firm* — Fenwick & West LLP

(57) ABSTRACT

A light emitting diode display device with a built-in touch sensor according to embodiments of the present disclosure may include a substrate, a driving transistor included in a subpixel, and including an active layer, a source electrode, a gate electrode and a drain electrode, a light emitting diode included in the subpixel, and including a first electrode and a second electrode, a driving voltage line including a reflective metal material, a first electrode connection pattern electrically connecting the driving voltage line and the first electrode, and including a transparent electrode material, a touch sensor electrode including the transparent electrode material, and a touch routing line electrically connected to the touch sensor electrode and disposed between the substrate and the touch sensor electrode.

20 Claims, 11 Drawing Sheets

Touch sensor unit

Row direction

Column direction

Touch sensor unit

TS

TR

PU

Row direction

Column direction

LIGHT EMITTING DIODE DISPLAY DEVICE WITH BUILT-IN TOUCH SENSOR

CROSS REFERENCE TO RELATED APPLICATION

This application claims priority from Republic of Korea Patent Application No. 10-2023-0161221, filed on Nov. 20, 2023, which is hereby incorporated by reference in its entirety.

TECHNICAL FIELD

Embodiments of the present disclosure relate to a light emitting diode display device with a built-in touch sensor.

BACKGROUND

Recently, research and development has been conducted on light emitting diode display devices using light emitting diodes as light emitting devices of subpixels.

Since a light emitting diode has high light conversion efficiency, the energy consumption is very low and the lifetime may be semi-permanent. In addition, if a light emitting diode is used as a light emitting device of a subpixels, there is an advantage in that a large-area display panel can be manufactured at low cost.

Meanwhile, there is a directionality of touch technology in which a touch sensor is embedded or built-in in a display panel in order to reduce the thickness of the display device and facilitate manufacturing.

SUMMARY

The inventors have recognized that, embedding a touch sensor in a display panel of a light emitting diode display device is not actually implemented due to various difficulties. Accordingly, exemplary embodiments of the present disclosure may provide a light emitting diode display device with a built-in touch sensor.

Exemplary embodiments of the present disclosure may provide a light emitting diode display device with a built-in touch sensor capable of transparent display.

Exemplary embodiments of the present disclosure may provide a light emitting diode display device with a built-in touch sensor installed in a vehicle.

Exemplary embodiments of the present disclosure may provide a light emitting diode display device with a built-in touch sensor capable of minimizing or at least reducing transmittance degradation.

Exemplary embodiments of the present disclosure may provide a light emitting diode display device with a built-in touch sensor having an arrangement structure of touch routing lines which enables bezel reduction.

Exemplary embodiments of the present disclosure may provide a light emitting diode display device with a built-in touch sensor which is easy to manufacture and may be reduced in weight by having a simple vertical structure.

Exemplary embodiments of the present disclosure may provide a light emitting diode display device with a built-in touch sensor having an arrangement structure of touch routing lines capable of reducing an influence between display driving and touch driving (in particular, a display-to-touch crosstalk DTX as an influence of display driving on touch driving).

Exemplary embodiments of the present disclosure may provide a light emitting diode display device with a built-in touch sensor for performing touch driving capable of reducing an influence between display driving and touch driving.

A light emitting diode display device with a built-in touch sensor according to embodiments of the present disclosure may include a substrate, a driving transistor included in a subpixel, and including an active layer, a source electrode, a gate electrode and a drain electrode, a light emitting diode included in the subpixel, and including a first electrode and a second electrode, a driving voltage line including a reflective metal material, a first electrode connection pattern electrically connecting the driving voltage line and the first electrode, and including a transparent electrode material, a touch sensor electrode including the transparent electrode material, and a touch routing line electrically connected to the touch sensor electrode and disposed between the substrate and the touch sensor electrode.

The light emitting diode display device with a built-in touch sensor according to embodiments of the present disclosure may further include a light shielding pattern disposed between the substrate and the active layer, and overlapping with the active layer.

In the light emitting diode display device with a built-in touch sensor according to embodiments of the present disclosure, the touch routing line may be disposed on the same layer as the light shielding pattern.

The light emitting diode display device with a built-in touch sensor according to embodiments of the present disclosure may further include a touch connection structure which electrically connects the touch sensor electrode and the touch routing line.

In the light emitting diode display device with a built-in touch sensor according to embodiments of the present disclosure, the touch connection structure may include a first touch connection pattern including a reflective metal material.

In the light emitting diode display device with a built-in touch sensor according to embodiments of the present disclosure, the touch connection structure may further include a second touch connection pattern disposed within a metal layer in which at least one of a gate electrode, a source electrode and a drain electrode is disposed A driving period of the light emitting diode display device with a built-in touch sensor according to embodiments of the present disclosure may includes a display driving period and a display hold period. A touch driving signal may be applied to the touch sensor electrode during the display hold period.

In the light emitting diode display device with a built-in touch sensor according to embodiments of the present disclosure, the touch routing line may include the reflective metal material.

When the light emitting diode display device with a built-in touch sensor according to embodiments of the present disclosure is in a display off state, a touch driving signal may be applied to the touch sensor electrode.

The light emitting diode display device with a built-in touch sensor according to embodiments of the present disclosure may include a transparent area where touch sensor electrodes are disposed, and a pixel area where the light emitting diode is disposed.

The light emitting diode display device with a built-in touch sensor according to embodiments of the present disclosure may be installed in a vehicle.

A light emitting diode display device with a built-in touch sensor according to embodiments of the present disclosure may include a substrate, a touch sensor including a plurality of touch sensor electrodes electrically connected to each other, and including a transparent electrode material, a light emitting diode including a first electrode and a second electrode, and a driving transistor including an active layer, a source electrode, a gate electrode and a drain electrode.

The touch sensor may include a horizontal connection pattern connecting the plurality of touch sensor electrodes in a horizontal direction and including the transparent electrode material, and a vertical connection pattern connecting the plurality of touch sensor electrodes in a vertical direction and including an opaque metal material.

The horizontal connection pattern may be located on the vertical connection pattern.

According to exemplary embodiments of the present disclosure, it is possible to provide a light emitting diode display device with a built-in touch sensor.

According to exemplary embodiments of the present disclosure, it is possible to provide a light emitting diode display device with a built-in touch sensor capable of transparent display.

According to exemplary embodiments of the present disclosure, it is possible to provide a light emitting diode display device with a built-in touch sensor installed in a vehicle.

According to exemplary embodiments of the present disclosure, it is possible to provide a light emitting diode display device with a built-in touch sensor capable of minimizing transmittance degradation.

According to exemplary embodiments of the present disclosure, it is possible to provide a light emitting diode display device with a built-in touch sensor which enables bezel reduction since the touch routing lines are connected to a pad unit across a display area (e.g., active area) without bypassing a non-display area (e.g., non-active area).

According to exemplary embodiments of the present disclosure, it is possible to provide a light emitting diode display device with a built-in touch sensor which is easy to manufacture and may be reduced in weight by having a simple vertical structure.

According to exemplary embodiments of the present disclosure, it is possible to provide a light emitting diode display device with a built-in touch sensor having an arrangement structure of touch routing lines capable of reducing an influence between display driving and touch driving (in particular, a display-to-touch crosstalk DTX as an influence of display driving on touch driving).

According to exemplary embodiments of the present disclosure, it is possible to provide a light emitting diode display device with a built-in touch sensor for performing touch driving capable of reducing an influence between display driving and touch driving.

The effects according to the present disclosure are not limited to the contents exemplified above, and more various effects are included in the present disclosure.

4

Figure 7:
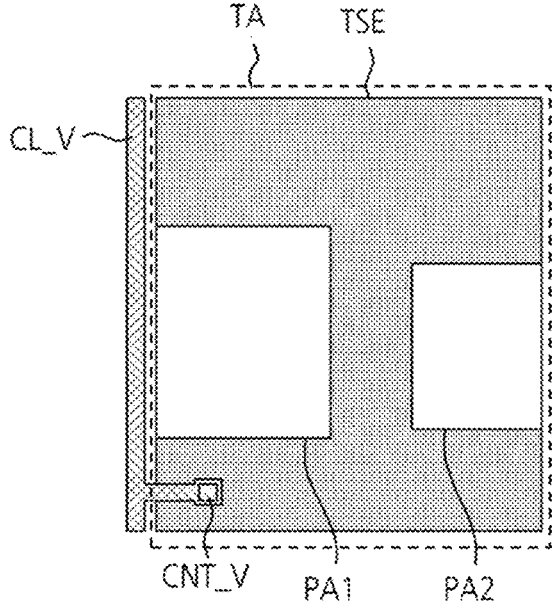

FIG. 7 illustrates an area where one touch sensor electrode is formed in a touch display panel according to embodiments of the present disclosure.

Figure 8:
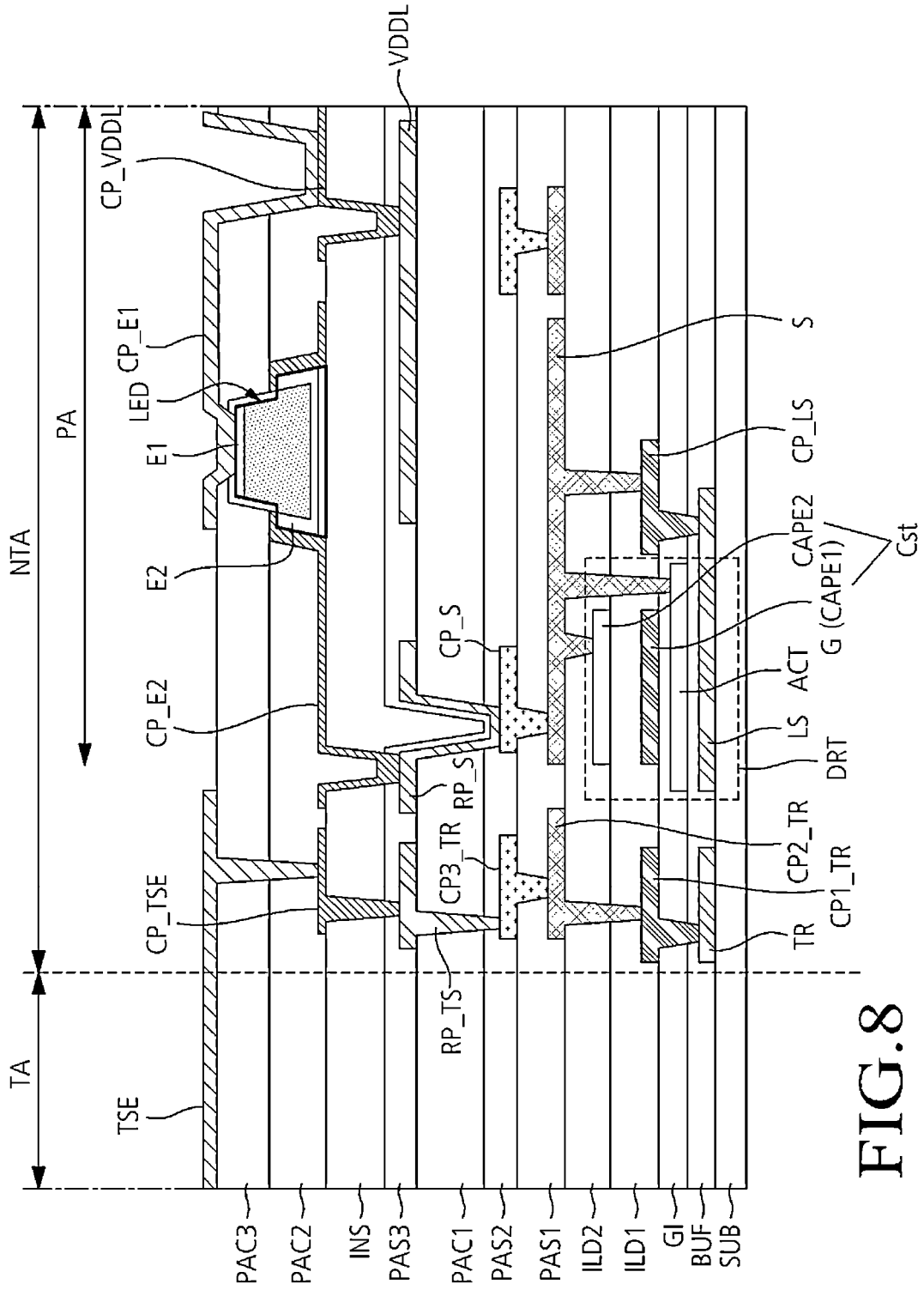
Figure 9:
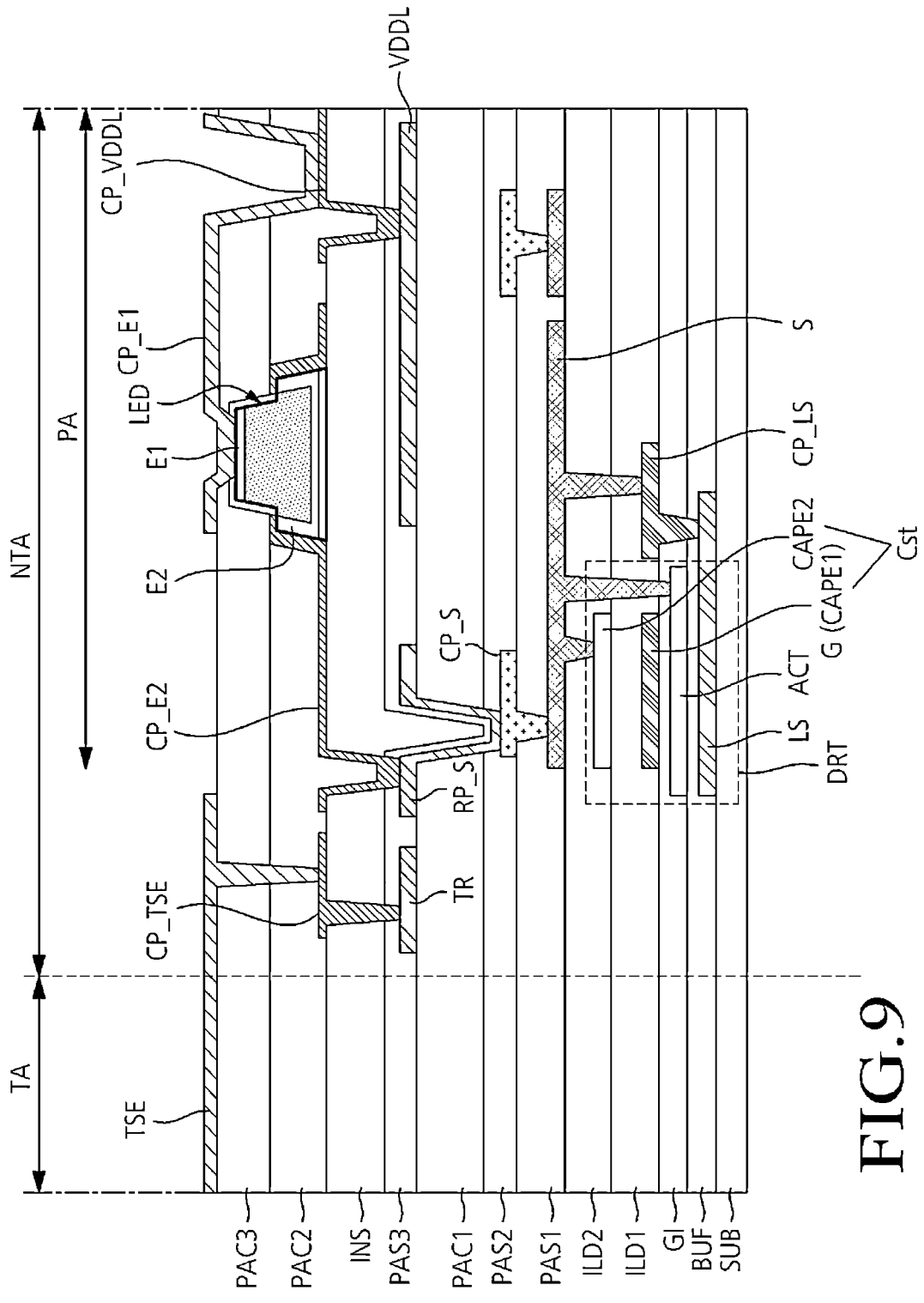

FIGS. 8 and 9 are cross-sectional views of a touch display panel according to embodiments of the present disclosure.

Figure 10:
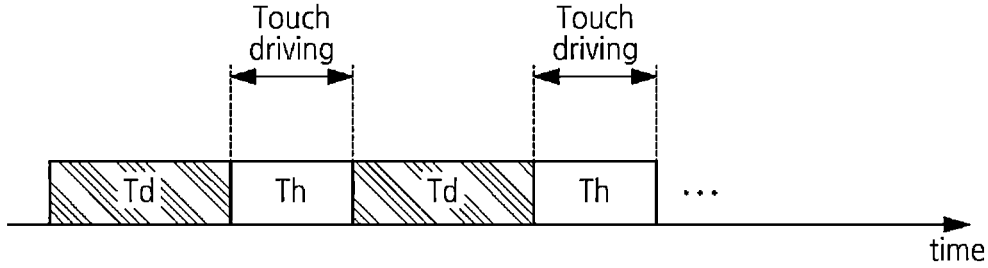
Figure 11:
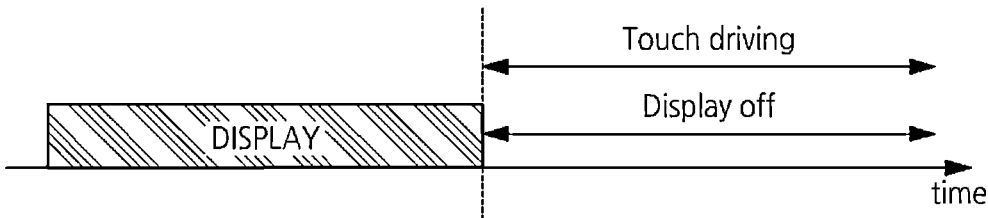

FIGS. 10 and 11 illustrate driving timing diagrams of a light emitting diode display device with a built-in touch sensor according to embodiments of the present disclosure.

DETAILED DESCRIPTION

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a", "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected", "coupled" or "linked", the two or more components may be directly "connected", "coupled" or "linked", or another component may intervene. Here, the other component may be included in one or more of the two or more components that are "connected", "coupled" or "linked" to each other.

When such terms as, e.g., "after", "next to", "after", and "before", are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

Figure 1:
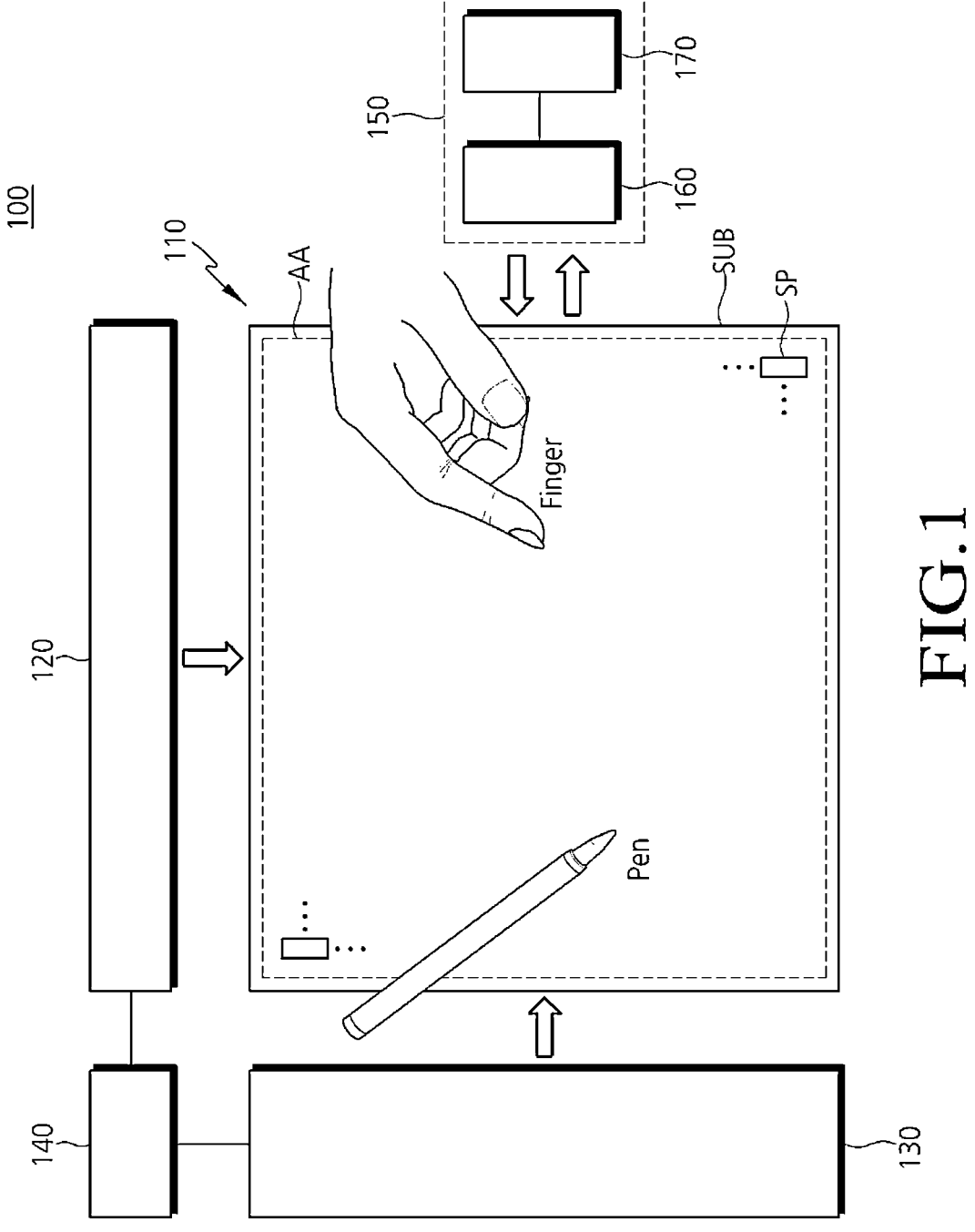
FIG. 1 is a system configuration diagram of a light emitting diode display device with a built-in touch sensor according to embodiments of the present disclosure.

FIG. 1 is a system configuration diagram of a light emitting diode display device 100 with a built-in touch sensor according to embodiments of the present disclosure.

Referring to FIG. 1, a light emitting diode display device 100 with a built-in touch sensor may include a touch display panel 110 and a display driving circuit as components for displaying an image.

The display driving circuit may be a circuit for driving display driving components included in the touch display panel 110 so that an image is displayed on the touch display panel 110, and may include a data driving circuit 120, a gate driving circuit 130, and a display controller 140.

The touch display panel 110 may include an active area AA where an image is displayed, and may further include a non-active area where an image is not displayed. Here, the non-active area may also be referred to as a bezel area. The touch display panel 110 may include a substrate SUB, a plurality of subpixels SP formed on the substrate SUB, and various signal lines.

Various types of signal lines may include a plurality of data lines transmitting data signals (also referred to as data voltages or image signals) and a plurality of gate lines transmitting gate signals (also referred to as scan signals). The plurality of data lines and the plurality of gate lines may intersect each other.

Each of the plurality of data lines may be disposed while extending in a first direction. Each of the plurality of gate lines may be disposed while extending in a second direction. Here, the first direction may be a column direction and the second direction may be a row direction. Alternatively, the first direction may be a row direction and the second direction may be a column direction. Hereinafter, for convenience of explanation, it is assumed that the data lines are arranged in the column direction and the gate lines are arranged in the row direction.

The data driving circuit 120 may be a circuit for driving the data lines, and may output data signals to the data lines. The gate driving circuit 130 may be a circuit for driving the gate lines, and may output gate signals to the gate lines. The display controller 140 may be a device for controlling the data driving circuit 120 and the gate driving circuit 130, and may control the driving timing for the data lines and the driving timing for the gate lines.

The display controller 140 may supply a data driving control signal to the data driving circuit 120 to control the data driving circuit 120, and may supply a gate driving control signal to the gate driving circuit 130 to control the gate driving circuit 130.

The data driving circuit 120 may supply data signals to a plurality of data lines according to the driving timing control of the display controller 140. The data driving circuit 120 may receive image data in digital form from the display controller 140, convert the received image data into data signals in analog form, and output the converted signals to the plurality of data lines.

The gate driving circuit 130 may supply gate signals to a plurality of gate lines GL according to the timing control of the display controller 140. The gate driving circuit 130 may receive a first gate voltage corresponding to a turn-on level voltage and a second gate voltage corresponding to a turn-off level voltage together with various gate driving control signals (e.g., a start signal, a reset signal, etc.), generate gate signals, and supply the generated gate signals to a plurality of gate lines GL.

For example, the data driving circuit 120 may be connected to the touch display panel 110 by a tape automated bonding (TAB) method, or may be connected to a bonding pad of the touch display panel 110 by a chip-on-glass (COG) or chip-on-panel (COP) method, or may be connected to the touch display panel 110 by being implemented as a chip-on-film (COF) method. Hereinafter, for convenience of explanation, it is assumed that the data drive circuit 120 is connected to the touch display panel 110 as a chip-on-film (COF) type.

The gate driving circuit 130 may be connected to the touch display panel 110 using a tape automated bonding (TAB) method, or may be connected to a bonding pad of the touch display panel 110 using a chip-on-glass (COG) or chip-on-panel (COP) method, or may be connected to the display panel 110 according to a chip-on-film (COF) method. Alternatively, the gate driving circuit 130 may be a gate-in-panel (GIP) type, and may be formed in the non-active area NA or the active area AA of the touch display panel 110. The gate driving circuit 130 may be disposed on or connected to the substrate SUB.

Meanwhile, at least one of the data driving circuit 120 and the gate driving circuit 130 may be disposed in the active area AA. For example, at least one of the data driving circuit 120 and the gate driving circuit 130 may be disposed not to overlap with the subpixels SP, or may be disposed to partially or entirely overlap with the subpixels SP.

The data driving circuit 120 may be connected to one side (e.g., the upper side or the lower side) of the touch display panel 110. Depending on the driving method, panel design method, etc., the data driving circuit 120 may be connected to both sides (e.g., the upper side and the lower side) of the touch display panel 110, or may be connected to two or more sides among the four sides of the touch display panel 110.

The gate driving circuit 130 may be connected to one side (e.g., the left side or the right side) of the touch display panel 110. Depending on the driving method, panel design method, etc., the gate driving circuit 130 may be connected to both sides (e.g., the left side and the right side) of the touch display panel 110, or may be connected to two or more sides among the four sides of the touch display panel 110.

The display controller 140 may be implemented as a separate component from the data driving circuit 120, or may be implemented as an integrated circuit integrated with the data driving circuit 120. The display controller 140 may be a timing controller used in typical display technology, or may be a control device capable of further performing other control functions including a timing controller, or may be a control device different from the timing controller, or may be a control device other than a timing controller, or may be a circuit within the control device. The display controller 140 may be implemented with various circuits or electronic components, such as an integrated circuit (IC), a field programmable gate array (FPGA), an application specific integrated circuit (ASIC), or a processor.

The display controller 140 may be mounted on a printed circuit board, a flexible printed circuit, etc., and may be electrically connected to the data driving circuit 120 and the gate driving circuit 130 through a printed circuit board, a flexible printed circuit. The display controller 140 may transmit and receive signals with the data driving circuit 120 according to one or more predetermined interfaces. For example, the interface may include a low voltage differential signaling (LVDS) interface, an embedded clock point-point interface (EPI) interface, or a serial peripheral interface (SPI).

In order to provide a touch sensing function in addition to an image display function, the light emitting diode display device 100 with a built-in touch sensor according to the embodiments of the present disclosure may include a touch sensor unit and a touch sensing circuit 150.

The touch sensor unit may include a plurality of touch sensors. Here, the touch sensors may also be referred to as touch electrodes.

The touch sensing circuit 150 may be a circuit that detects whether a touch has occurred by a touch object such as a finger or pen by sensing all or part of a plurality of touch sensors included in a touch sensor unit, or detects a touch location. The touch sensing circuit 150 may include a touch driving circuit 160 for sensing at least one of a plurality of touch sensors to generate touch sensing data, and a touch controller 170 capable of detecting touch occurrence or a touch location using the touch sensing data.

In the light emitting diode display device 100 with a built-in touch sensor, the touch sensor unit may further include a plurality of touch routing lines for electrically connecting the plurality of touch sensors and the touch driving circuit 160. Here, the touch routing line may also be referred to as a touch line, an external routing line, or an external touch routing line.

One touch sensor may be composed of one touch sensor electrode.

Alternatively, one touch sensor may be composed of two or more touch sensor electrodes that are electrically connected. In this case, one touch sensor may further include a bridge which electrically connects the two or more touch sensor electrodes. Here, the bridge may also be referred to as a bridge pattern, a bridge electrode, a bridge line, an internal touch line, an internal touch routing line, or an internal routing line.

The touch display panel 110 may be a touch sensor-embedded display panel or a display panel with built-in touch sensor. That is, the touch sensor unit may be arranged inside the touch display panel 110. In this case, during the manufacturing process of the touch display panel 110, the touch sensor unit (e.g., touch sensors, touch routing lines) may be formed together with electrodes or signal lines related to display driving.

The touch sensing circuit 150 in the light emitting diode display device 100 with a built-in touch sensor may perform touch sensing in a self-capacitance sensing manner and/or a mutual-capacitance sensing manner.

In the case that the touch sensing circuit 150 performs touch sensing in a self-capacitance sensing manner, the touch sensing circuit 150 may perform touch sensing based on the capacitance between each touch electrode and a touch object (e.g., a finger, a pen, etc.).

In order to perform touch sensing in a self-capacitance sensing manner, the touch driving circuit 160 may supply a touch driving signal to at least one touch sensor among a plurality of touch sensors, and sense at least one touch sensor to which the touch driving signal is supplied to generate touch sensing data. The touch controller 170 may detect the self-capacitance or the amount of change in self-capacitance of the touch sensor using the touch sensing data, and determine the presence or absence of a touch and/or the touch coordinates based on the detection result.

If the touch sensing circuit 150 performs touch sensing in a mutual-capacitance sensing manner, the touch sensing circuit 150 may perform touch sensing based on the capacitance between the touch sensors. According to the mutual-capacitance sensing manner, a plurality of touch sensors may be classified into a transmitting touch sensor (also referred to as a driving touch sensor) and a receiving touch sensor (also referred to as a sensing touch sensor) according to the functions and roles.

In order to perform touch sensing in a mutual-capacitance sensing manner, the touch driving circuit 160 may drive at least one transmitting touch sensor and sense at least one receiving touch sensor to generate touch sensing data. The touch controller 170 may detect the mutual-capacitance or mutual-capacitance change amount between the transmitting touch sensor and the receiving touch sensor using the touch sensing data, and determine the presence or absence of a touch and/or the touch coordinates based on the detection result.

Each of the touch driving circuit 160 and the touch controller 170 may be implemented as a separate integrated circuit. Alternatively, the touch driving circuit 160 and the touch controller 170 may be implemented as a single integrated circuit.

In addition, each of the touch driving circuit 160 and the data driving circuit 120 may be implemented as a separate integrated circuit. Alternatively, the touch driving circuit 160 and the data driving circuit 120 may be implemented in an integrated manner. For example, if the light emitting diode display device 100 with a built-in touch sensor includes one driving integrated circuit chip, the one driving integrated circuit chip may include the touch driving circuit 160 and the data driving circuit 120. For another example, if the light emitting diode display device 100 with a built-in touch sensor includes a plurality of driving integrated circuit chips, each of the plurality of driving integrated circuit chips may include a part of the touch driving circuit 160 and a part of the data driving circuit 120.

The light emitting diode display device 100 with a built-in touch sensor may further include a power supply circuit which supplies various types of power to the display driving circuit and/or the touch sensing circuit.

The light emitting diode display device 100 with a built-in touch sensor according to the embodiments of the present disclosure may be a mobile terminal such as a smart phone or a tablet, or a monitor or television (TV) of various sizes, and is not limited thereto, and may be a display of various types and sizes capable of displaying information or images. In some cases, the light emitting diode display device 100 with a built-in touch sensor according to the embodiments of the present disclosure may be a tiling display including a plurality of display panels 110.

The light emitting diode display device 100 with a built-in touch sensor may be a self-luminous display device in which the touch display panel 110 emits light by itself. Accordingly, each of the plurality of subpixels SP in the touch display panel 110 may include various types of light emitting devices.

Figure 2:
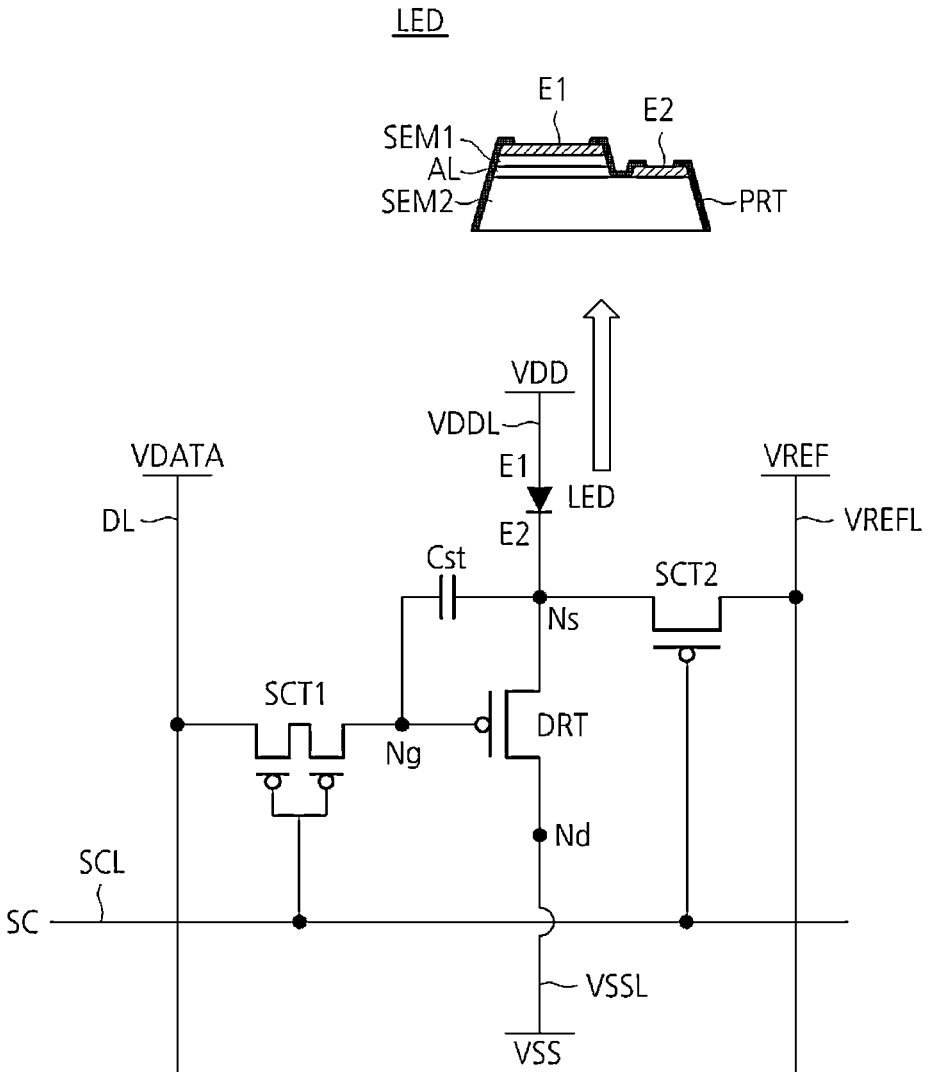
FIG. 2 is an equivalent circuit of a subpixel in a light emitting diode display device with a built-in touch sensor according to embodiments of the present disclosure.

FIG. 2 is an equivalent circuit of a subpixel in a light emitting diode display device with a built-in touch sensor according to embodiments of the present disclosure.

Referring to FIG. 2, in the light emitting diode display device 100 with a built-in touch sensor according to the embodiments of the present disclosure, the touch display panel 110 may include a plurality of subpixels SP formed on a substrate SUB. Each of the plurality of subpixels SP may include a light emitting diode LED, a driving transistor DRT, a first scan transistor SCT1, and a storage capacitor Cst.

The light emitting diode LED may be a light emitting device of each subpixel SP, and may include a first electrode E1 and a second electrode E2. The light emitting diode LED may also be referred to as a light emitting diode chip. For example, the light emitting diode LED may be a micro light emitting diode (also referred to as a micro light emitting diode chip) or a nano light emitting diode (also referred to as a nano light emitting diode chip) which uses an inorganic semiconductor compound to emit light. The light emitting diode LED may have a length/width in micro or nanometer units.

In a light emitting diode LED, the first electrode E1 may be an anode electrode and the second electrode E2 may be a cathode electrode. Alternatively, the first electrode E1 may be a cathode electrode and the second electrode E2 may be an anode electrode. Hereinafter, for convenience of explanation, it is assumed that the first electrode E1 is an anode electrode and the second electrode E2 is a cathode electrode.

The first electrode E1 of the light emitting diode LED may be electrically connected to a first power line VDDL. Accordingly, a first power voltage VDD may be applied to the first electrode E1 of the light emitting diode LED through the first power line VDDL.

The second electrode E2 of the light emitting diode LED may be electrically connected to a source node Ns of the driving transistor DRT.

The driving transistor DRT may be a transistor for driving the light emitting diode LED, and may include a gate node Ng, a source node Ns, and a drain node Nd. Here, the gate node Ng may be referred to as a gate electrode, the source node Ns may be referred to as a source electrode, and the drain node Nd may be referred to as a drain electrode.

The first scan transistor SCT1 may control the connection between the gate node Ng of the driving transistor DRT and a data line DL by a scan signal SC.

The first scan transistor SCT1 may be turned on to transmit a data voltage VDATA to the gate node Ng of the driving transistor DRT.

The storage capacitor Cst may serve to maintain a constant voltage for one frame, and may be connected between the second electrode E2 of the light emitting diode LED and the gate node Ng of the driving transistor DRT. Here, the second electrode E2 of the light emitting diode LED may be electrically connected to the source node Ns of the driving transistor DRT, or may be the same node as the source node Ns of the driving transistor (DRT).

Referring to FIG. 2, each of the plurality of subpixels SP may further include a second scan transistor SCT2 connected between the second electrode E2 of the light emitting diode LED and a reference voltage line RVL.

The second scan transistor SCT2 may control the connection between the second electrode E2 of the light emitting diode LED and the reference voltage line RVL by the scan signal SC. Here, the second electrode E2 of the light emitting diode LED may be electrically connected to the source node Ns of the driving transistor DRT, or may be the same node as the source node Ns of the driving transistor DRT.

Referring to FIG. 2, a gate node of the first scan transistor SCT1 and a gate node of the second scan transistor SCT2 may be commonly connected to one scan line SCL. Alternatively, the gate node of the first scan transistor SCT1 and the gate node of the second scan transistor SCT2 may be connected to separate scan lines SCL.

The light emitting diode LED may include a first semiconductor layer SEMI1, a second semiconductor layer SEMI2, and an active layer AL. The first semiconductor layer SEMI1 may be formed on at least one upper surface of the second semiconductor layer SEMI2, and may expose at least a portion of the other upper surface of the second semiconductor layer SEMI2. The active layer AL may be interposed between the first semiconductor layer SEMI1 and the second semiconductor layer SEMI2. Here, the active layer AL may also be referred to as an emission layer. The light emitting diode LED may further include a first electrode E1 and a second electrode E2.

The first electrode E1 may be formed on the first semiconductor layer SEMI1, and may be electrically connected to the first semiconductor layer SEMI1. The second electrode E2 may be formed on the exposed second semiconductor layer SEMI2, and may be electrically connected to the second semiconductor layer SEMI2. The first electrode E1 and the second electrode E2 may be arranged to be spaced apart from each other by a predetermined interval.

The first semiconductor layer SEMI1 may be implemented as a p-type semiconductor layer.

The second semiconductor layer SEMI2 may be implemented as an n-type semiconductor layer.

The active layer AL may be a layer which emits light by the difference in the band gap of the energy band according to the material forming the active layer AL when the holes injected through the first semiconductor layer SEMI1 and the electrons injected through the second semiconductor layer SEMI2 meet each other.

The light emitting diode LED may further include an insulating film PRT to protect the elements of the light emitting diode LED. The insulating film PRT may cover the exposed outer surface of the light emitting diode LED, but may expose at least a part of the first electrode E1 and at least a part of the second electrode E2. The insulating film PRT may include an insulating material. For example, the insulating film PRT may be formed of one selected from a silicon oxide film (SiOx) and a silicon nitride film (SiNx), or a laminated structure thereof.

Meanwhile, the touch display panel 110 may include an electrode electrically connected to a first electrode E1 of a light emitting diode LED and an electrode electrically connected to a second electrode E2 of the light emitting diode LED.

The touch display panel 110 may further include a second power line BVL for supplying a second power voltage VSS to a drain node Nd of the driving transistor DRT. The second power line BVL may be electrically connected to a drain node Nd of the driving transistor DRT.

Meanwhile, for another example, the light emitting diode LED may be an organic light emitting diode (OLED) including an organic light emission layer between the first electrode E1 and the second electrode E2.

The first scan transistor SCT1 may be connected between the gate node Ng of the driving transistor DRT and the corresponding data line DL, and may control a voltage state of the gate node Ng of the driving transistor DRT.

The first scan transistor SCT1 may control the connection between the gate node Ng of the driving transistor DRT and the data line DL according to a scan signal SC supplied from a corresponding scan line SCL among a plurality of scan lines SCL, which are a type of gate line.

The drain node or the source node of the first scan transistor SCT1 may be electrically connected to the corresponding data line DL. The source node or drain node of the first scan transistor SCT1 may be electrically connected to the gate node Ng of the driving transistor DRT. The gate node of the first scan transistor SCT1 may be electrically connected to a scan line SCL to receive a scan signal SC.

The first scan transistor SCT1 may be turned on by a scan signal SC of a turn-on level voltage, and may transmit the data voltage VDATA supplied from the corresponding data line DL to the gate node Ng of the driving transistor DRT.

The first scan transistor SCT1 may be turned on by a scan signal SC of a turn-on level voltage, and may be turned off by a scan signal SC of a turn-off level voltage. Here, if the first scan transistor SCT1 is an n-type transistor, the turn-on level voltage may be a high-level voltage, and the turn-off level voltage may be a low-level voltage. As shown in FIG. 2, if the first scan transistor SCT1 is a p-type transistor, the turn-on level voltage may be a low-level voltage, and the turn-off level voltage may be a high-level voltage.

The second scan transistor SCT2 may be connected between the source node Ns of the driving transistor DRT and the corresponding reference voltage line RVL, and may control the voltage state of the source node Ns of the driving transistor DRT.

The second scan transistor SCT2 may control the connection between the source node Ns of the driving transistor DRT and the reference voltage line RVL according to a scan signal SC supplied from the scan line SCL, which is a type of gate line.

A drain node or a source node of the second scan transistor SCT2 may be electrically connected to the corresponding reference voltage line RVL. The source node or the drain node of the second scan transistor SCT2 may be electrically connected to the source node Ns of the driving transistor DRT. A gate node of the second scan transistor SCT2 may be electrically connected to a scan line SCL) and receive the scan signal SC.

The second scan transistor SCT2 may be turned on by the scan signal SC of the turn-on level voltage, and may transmit a reference voltage VREF supplied from the corresponding reference voltage line RVL to the source node Ns of the driving transistor DRT.

The second scan transistor SCT2 may be turned on by the scan signal SC of the turn-on level voltage, and may be turned off by a scan signal SC of a turn-off level voltage. Here, if the second scan transistor SCT2 is of the n type, the turn-on level voltage may be a high level voltage, and the turn-off level voltage may be a low level voltage. As shown in FIG. 2, if the second scan transistor SCT2 is of the p type, the turn-on level voltage may be a low level voltage, and the turn-off level voltage may be a high level voltage.

The storage capacitor Cst may be an external capacitor intentionally designed outside the driving transistor DRT, rather than a parasitic capacitor (e.g., Cgs, Cgd) that may exist between the gate node Ng and the source node Ns of the driving transistor DRT.

Each of the driving transistor DRT, the first scan transistor SCT1, and the second scan transistor SCT2 may be an n-type transistor or a p-type transistor.

As illustrated in FIG. 2, each subpixel SP may have a 3T(Transistor)-1C(Capacitor) structure including three transistors DRT, SCT1 and SCT2 and one capacitor Cst, and in some cases, may further include one or more transistors or one or more capacitors. However, the present disclosure is not limited thereto. Each subpixel may further include a compensation circuit. In this case, the subpixel may have various structures such as 4T2C, 5T2C, 6T1C, 6T2C, 7T1C, and 7T2C.

Each of the transistors of each subpixel may include a gate electrode, a source electrode, and a drain electrode. As the source electrode and the drain electrode may be changed according to a voltage applied to the gate electrode and a current direction without being fixed, any one of the source electrode and the drain electrode may be represented as a first electrode, and the other may be represented as a second electrode.

The light emitting diode display device 100 with a built-in touch sensor may have a top emission structure in which light is emitted in the opposite direction of the substrate SUB) of the touch display panel 110.

Figure 3:
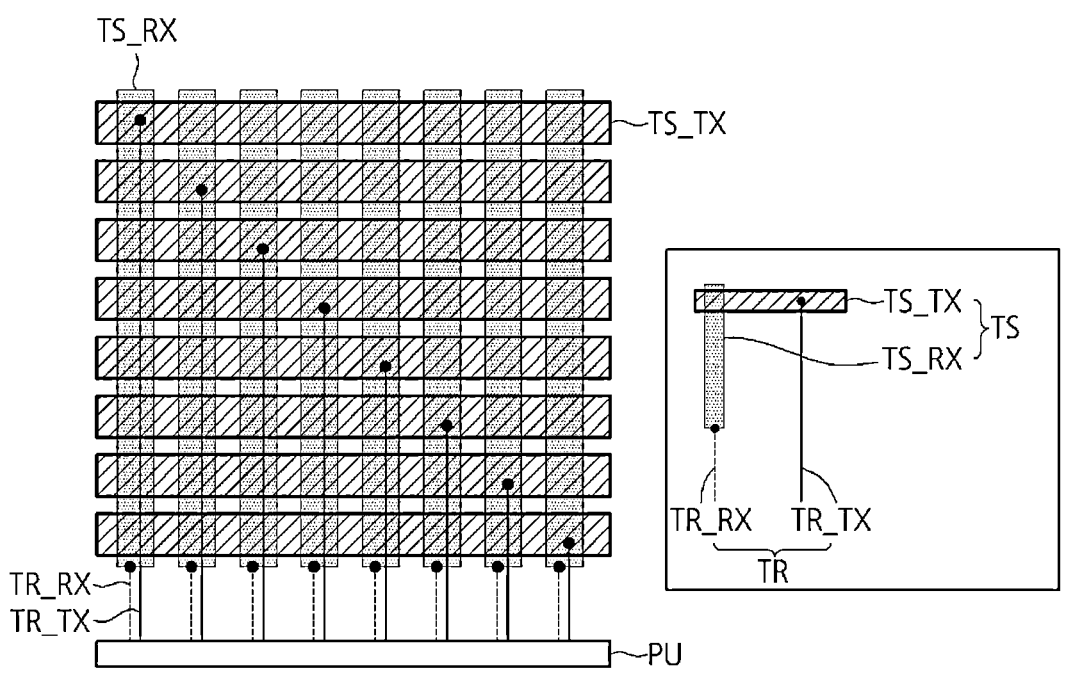
FIGS. 3 to 5 illustrate planar structures of a touch sensor unit included in a touch display panel according to embodiments of the present disclosure.
Figure 3:
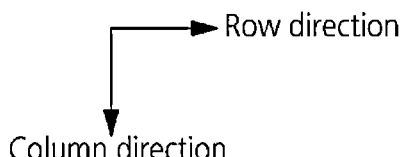
Figure 4:
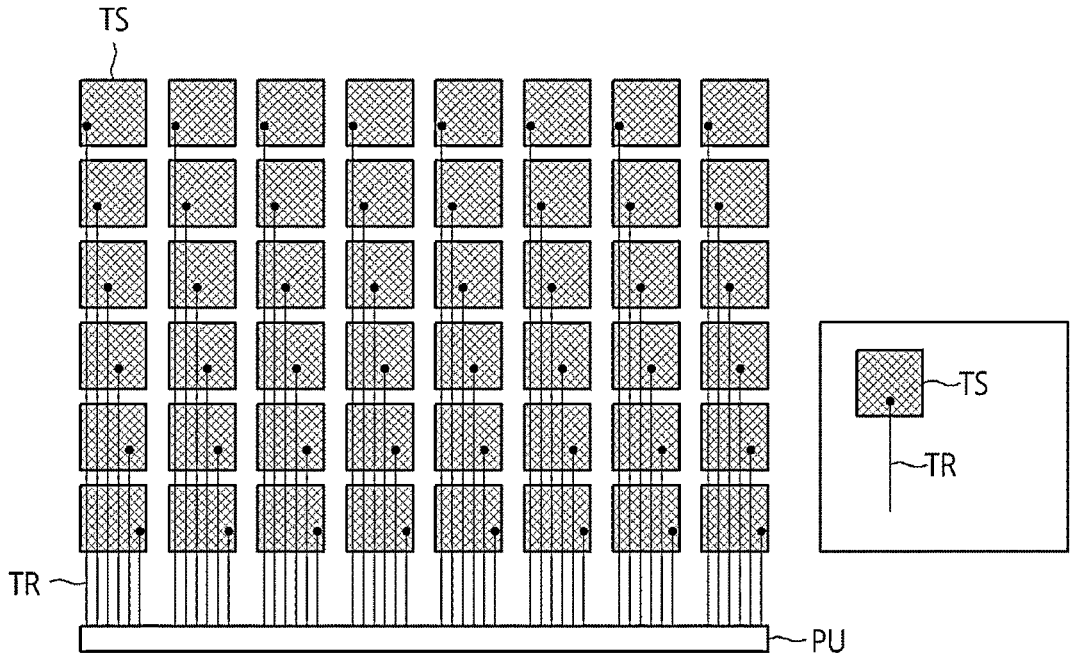
Figure 4:
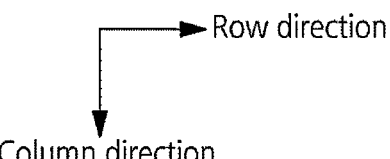
Figure 5:
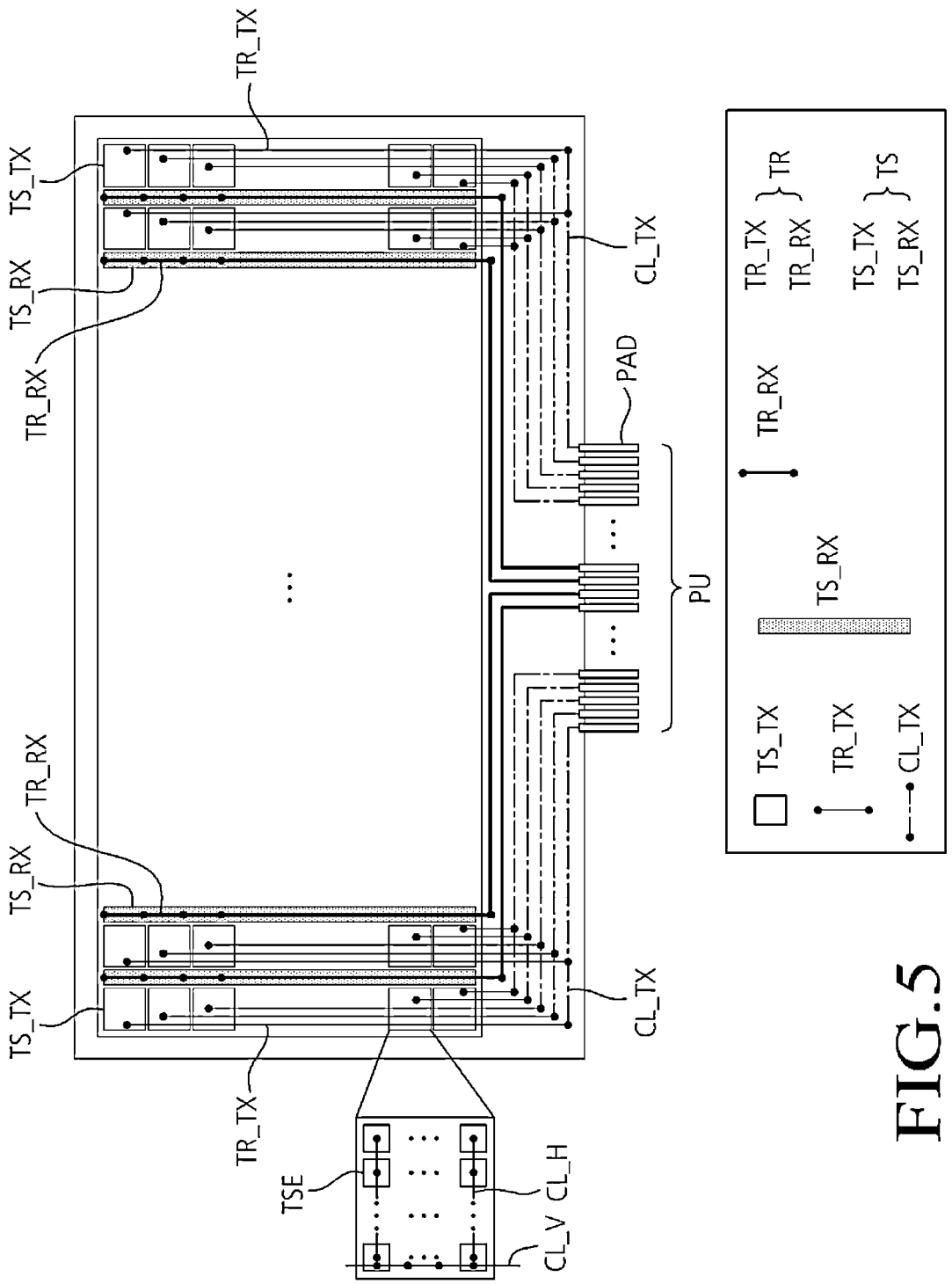

FIGS. 3 to 5 illustrate planar structures of a touch sensor unit included in a touch display panel 110 according to embodiments of the present disclosure.

Referring to FIG. 3, a touch sensor unit included in the touch display panel 110 may include a plurality of touch sensors TS and a plurality of touch routing lines TR.

The plurality of touch sensors TS may include a plurality of first touch sensors TS_TX and a plurality of second touch sensors TS_RX.

The plurality of first touch sensors TS_TX and the plurality of second touch sensors TS_RX may intersect each other. For example, each of the plurality of first touch sensors TS_TX may be disposed while extending in the row direction (e.g., horizontal direction), and each of the plurality of second touch sensors TS_RX may be disposed while extending in the column direction (e.g., vertical direction).

Alternatively, each of the plurality of first touch sensors TS_TX may be arranged while extending in the column direction (e.g., vertical direction), and each of the plurality of second touch sensors TS_RX may be arranged while extending in the row direction (e.g., horizontal direction). However, hereinafter, for the convenience of explanation, it is assumed that each of the plurality of first touch sensors TS_TX is disposed while extending in the row direction (e.g., horizontal direction), and each of the plurality of second touch sensors TS_RX is disposed while extending in the column direction (e.g., vertical direction).

The plurality of touch routing lines TR may be wirings or lines (e.g., touch lines) for electrical connection between the plurality of touch sensors TS and a pad unit PU. Here, the pad unit PU may include a plurality of pads to which the touch driving circuit 160 is electrically connected.

The plurality of touch routing lines TR may include a plurality of first touch routing lines TR_TX for electrical connection between the plurality of first touch sensors TS_TX and the pad unit PU, and a plurality of second touch routing lines TR_RX for electrical connection between the plurality of second touch sensors TS_RX and the pad unit PU. Each of the plurality of first touch routing lines TR_TX may extend in the column direction (or row direction), and may be connected to the pad unit PU. Each of the plurality of second touch routing lines TR_RX may extend in the column direction (or row direction), and may be connected to the pad unit PU.

The touch sensor unit according to the embodiments of the present disclosure may be a mutual-capacitance sensing-based touch sensor unit, such as the example of FIG. 3.

In this case, the plurality of first touch sensors TS_TX may be a plurality of transmitting touch sensors, and the plurality of second touch sensors TS_RX may be a plurality of receiving touch sensors. The plurality of first touch routing lines TR_TX may be a plurality of transmitting touch routing lines, and the plurality of second touch routing lines TR_RX may be a plurality of receiving touch routing lines.

Therefore, hereinafter, the plurality of first touch sensors TS_TX may also be referred to as a plurality of transmitting touch sensors, and the plurality of second touch sensors TS_RX may also be referred to as a plurality of receiving touch sensors. The plurality of first touch routing lines TR_TX may also be referred to as a plurality of transmitting touch routing lines, and the plurality of second touch routing lines TR_RX may also be referred to as a plurality of receiving touch routing lines. However, the present disclosure is not limited thereto, the plurality of first touch sensors may be a plurality of receiving touch sensors, and the plurality of second touch sensors may be a plurality of transmitting touch sensors. The plurality of first touch routing lines may be a plurality of receiving touch routing lines, and the plurality of second touch routing lines may be a plurality of transmitting touch routing lines.

If the touch sensor unit according to the embodiments of the present disclosure is a touch sensor unit based on mutual-capacitance sensing, the touch driving circuit 160 may supply a touch driving signal to at least one of the plurality of transmitting touch sensors TS_TX through at least one of the plurality of transmitting touch routing lines TR_TX, and the touch driving circuit 160 may sense all or part of the plurality of receiving touch sensors TS_RX through all or part of the plurality of receiving touch routing lines TR_RX.

A signal sensed by the touch driving circuit 160 of all or part of the plurality of receiving touch sensors TS_RX may be a signal corresponding to the mutual capacitance between all or part of the plurality of receiving touch sensors TS_RX and at least one transmitting touch sensor TS_TX.

In the touch sensor unit, if each transmitting touch sensor TS_TX is arranged while extending in the row direction and each receiving touch sensor TS_RX is arranged while extending in the column direction, each of the plurality of transmitting touch routing lines TR_TX may be disposed around the outer periphery by being connected at the end of each of the plurality of transmitting touch sensors TS_TX. In this case, each of the plurality of transmitting touch routing lines TR_TX may not overlap with another touch sensor TS. In contrast, as illustrated in FIG. 3, each of the plurality of transmitting touch routing lines TR_TX may be extended while overlapping with the receiving touch sensor TS_RX, and may be connected to the pad unit PU.

Accordingly, all of the touch routing lines TR may be disposed to extend directly to the pad unit PU by passing through the active area AA without being connected to the pad unit PU by detouring or bypassing along the left and right outer areas of the active area AA. This arrangement structure of the touch routing lines TR may be referred to as an inner routing structure.

Unlike FIG. 3, in the touch sensor unit, if each transmitting touch sensor TS_TX is disposed to extend in the column direction and each receiving touch sensor TS_RX is disposed to extend in the row direction according to the internal routing structure, each of the plurality of receiving touch routing lines TR_RX may be connected to the pad unit PU while extending to overlap with the transmitting touch sensor TS_TX.

According to the internal routing structure as above, each of the plurality of transmitting touch routing lines TR_TX may be extended while overlapping with the receiving touch sensor TS_RX, and may be connected to the pad unit PU, or each of the plurality of receiving touch routing lines TR_RX may be extended while overlapping with the transmitting touch sensor TS_TX and may be connected to the pad unit PU while, touch routing lines TR may be not disposed on the three side outer surfaces of the touch sensor unit. Therefore, according to the internal routing structure, there may be significantly reduced a size of the bezel.

FIG. 4 illustrates another planar structure of a touch sensor unit included in a touch display panel 110 according to embodiments of the present disclosure.

Referring to FIG. 4, the touch sensor unit included in the touch display panel 110 may include a plurality of touch sensors TS and a plurality of touch routing lines TR.

The plurality of touch sensors TS may be disposed spaced apart from each other.

The plurality of touch routing lines TR may electrically connect each of the plurality of touch sensors TS to the pad unit PU. Each of the plurality of touch routing lines TR may extend in the column direction (or row direction), and may be connected to the pad unit PU. Each of the plurality of touch routing lines TR may overlap with two or more touch sensors TS, which may correspond to the internal routing structure described above.

The touch sensor unit according to the embodiments of the present disclosure may be a self-capacitance sensing-based touch sensor unit, such as the example of FIG. 4.

If the touch sensor unit according to the embodiments of the present disclosure is a self-capacitance sensing-based touch sensor unit, the touch driving circuit 160 may supply a touch driving signal to at least one of the plurality of touch sensors TS through at least one of the plurality of touch routing lines TR, and the touch driving circuit 160 may sense the touch sensor TS supplied with the touch driving signal through the corresponding touch routing line TR.

The signal sensed by the touch driving circuit 160 of at least one touch sensor TS may be a signal corresponding to the self-capacitance between at least one touch sensor TS and a touch object (e.g., a finger, a pen).

Figure 6:
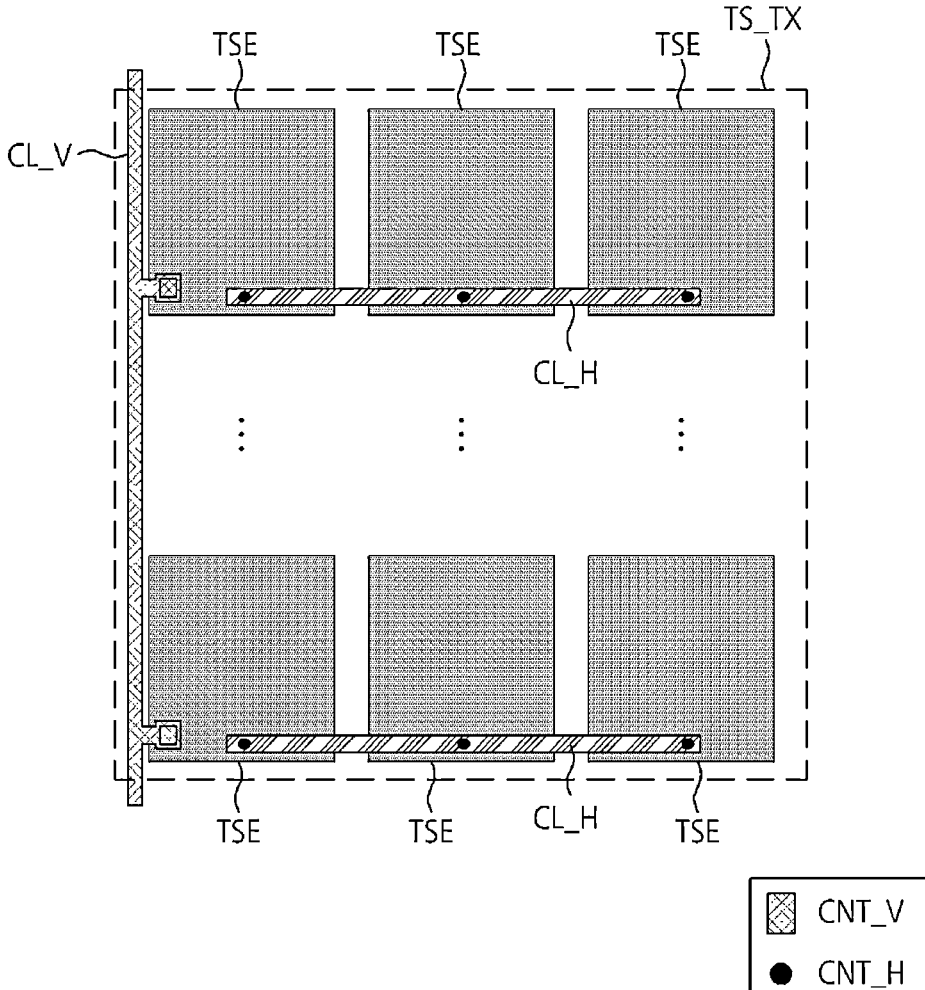
FIG. 6 illustrates an area where one touch sensor is formed in a touch display panel according to embodiments of the present disclosure.

FIG. 5 illustrates another planar structure of a touch sensor unit included in a touch display panel 110 according to embodiments of the present disclosure, and FIG. 6 illustrates an area in which one touch sensor TS is formed in a touch display panel according to embodiments of the present disclosure.

The touch sensor unit according to embodiments of the present disclosure illustrated in FIG. 5 is another example of a touch sensor unit based on mutual-capacitance sensing.

Referring to FIG. 5, the touch display panel 110 according to embodiments of the present disclosure may include a plurality of touch sensors TS and a plurality of touch routing lines TR.

The touch display panel 110 according to embodiments of the present disclosure may include a plurality of pads PAD and a pad unit PU. The plurality of touch routing lines TR may electrically connect the plurality of touch sensors TS and the plurality of pads PAD.

Referring to FIG. 5, the plurality of touch sensors TS may include a plurality of first touch sensors TS_TX and a plurality of second touch sensors TS_RX. The plurality of touch routing lines TR may include a plurality of first touch routing lines TR_TX and a plurality of second touch routing lines TR_RX.

Referring to FIG. 5, the plurality of first touch sensors TS_TX may be arranged in a matrix form. Accordingly, the plurality of first touch sensors TS_TX may configure two or more first touch sensor rows, and may configure two or more first touch sensor columns.

Referring to FIG. 5, each of the plurality of second touch sensors TS_RX may be disposed between two adjacent first touch sensor columns.

Referring to FIG. 5, among the plurality of first touch sensors TS_TX, the first touch sensors TS_TX disposed in the same row may be electrically connected to each other by the first touch routing lines TR_TX and a first connection lines CL_TX.

Referring to FIG. 5 and FIG. 6, each of the plurality of first touch sensors TS_TX may be configured in a mesh form including a plurality of touch sensor electrodes TSE electrically connected to each other.

Referring to FIG. 5 and FIG. 6, each of the plurality of first touch sensors TS_TX may include a horizontal connection pattern CL_H which connects the plurality of touch sensor electrodes TSE in a horizontal direction (e.g., row direction) through a plurality of horizontal connection contact holes CNT_H, and a vertical connection pattern CL_V which connects the plurality of touch sensor electrodes TSE in a vertical direction (e.g., column direction) through at least one vertical connection contact CNT_V.

Referring to FIG. 6, the horizontal connection pattern CL_H may also be referred to as a parallel connection pattern, and the vertical connection pattern CL_V may also be referred to as an orthogonal connection pattern.

Referring to FIG. 6, for example, the horizontal connection pattern CL_H may include a transparent electrode material, and the vertical connection pattern CL_V may include an opaque metal material.

Referring to FIGS. 5 and 6, the vertical connection pattern CL_V may be a part of the touch routing line TR. Alternatively, the vertical connection pattern CL_V may be config-
ured separately from the touch routing line TR.

Referring to FIG. 5, not only the plurality of first touch
sensors TS_TX, but also the plurality of second touch
sensors TS_RX may be configured in a mesh form, includ-
ing a plurality of touch sensor electrodes TSE electrically
connected to each other.

Referring to FIG. 5, if the touch sensor unit according to
the embodiments of the present disclosure is a mutual-
capacitance sensing-based touch sensor unit, the first touch
sensors TS_TX arranged in the same row among the plu-
rality of first touch sensors TS_TX may be electrically
connected to form a transmitting touch sensor line (or a
receiving touch sensor line), and each of the plurality of
second touch sensors TS_RX may form a receiving touch
sensor line (or a transmitting touch sensor line).

Referring to FIG. 5, in the light emitting diode display
device 100 with a built-in touch sensor according to the
embodiments of the present disclosure, the touch routing
lines TR may be connected to the pad unit across the display
area (e.g., active area AA) without bypassing the non-
display area (e.g., non-active area NA). According to this
touch routing structure, the size of the non-display area (i.e.,
bezel) may be reduced.

FIG. 7 illustrates an area where one touch sensor electrode
TSE is formed in a touch display panel 110 according to
embodiments of the present disclosure.

Referring to FIG. 7, in the touch display panel 110
according to the embodiments of the present disclosure, an
area where one touch sensor electrode TSE is formed may
include a transparent area TA where one touch sensor
electrode TSE is disposed, and a pixel area PA1 and PA2
where at least one light emitting diode LED is disposed.
Here, the transparent area TA may be also referred to as a
transmission area.

The transparent area TA may be an area through which
light can penetrate or transmit the display panel 110, and
may mean an area where light can transmit from the front (or
back) of the display panel 110 to the back (or front). An
opaque metal may not be located in the transparent area TA.

An area excluding the transparent area TA may be a
non-transparent area, and the non-transparent area may
include a pixel area PA1 and PA2 where subpixels SP for the
display are disposed. The pixel area PA1 and PA2 may
include light emitting devices and transistors included in
each of the subpixels SP, and may include an emission area
where light is emitted by the light emitting device. The
transistors may be thin-film transistors TFTs.

Active layers of thin-film transistors TFTs may be formed
of a semiconductor material, such as an oxide semiconduc-
tor, amorphous semiconductor, or polycrystalline semicon-
ductor, but is not limited thereto.

The oxide semiconductor material may have an excellent
effect of preventing a leakage current and relatively inex-
pensive manufacturing cost. The oxide semiconductor may
be made of a metal oxide such as zinc (Zn), indium (In),
gallium (Ga), tin (Sn), and titanium (Ti) or a combination of
a metal such as zinc (Zn), indium (In), gallium (Ga), tin (Sn),
or titanium (Ti) and its oxide. Specifically, the oxide semi-
conductor may include zinc oxide (ZnO), zinc-tin oxide
(ZTO), zinc-indium oxide (ZIO), indium oxide (InO), tita-
nium oxide (TiO), indium-gallium-zinc oxide (IGZO),
indium-zinc-tin oxide (IZTO), indium zinc oxide (IZO),
indium gallium tin oxide (IGTO), and indium gallium oxide
(IGO), but is not limited thereto.

The polycrystalline semiconductor material has a fast
movement speed of carriers such as electrons and holes and thus has high mobility, and has low energy power consump-
tion and superior reliability. The polycrystalline semicon-
ductor may be made of polycrystalline silicon (poly-Si), but
is not limited thereto.

The amorphous semiconductor material may be made of
amorphous silicon (a-Si), but is not limited thereto.

Accordingly, since the area where one touch sensor elec-
trode TSE is formed includes a transparent area TA where
one touch sensor electrode TSE is disposed, the light emit-
ting diode display device 100 with a built-in touch sensor
according to the embodiments of the present disclosure may
be implemented as a transparent display device.

Referring to FIG. 7, a vertical connection pattern CL_V
may be disposed on one side of the transparent area TA. The
vertical connection pattern CL_V may be vertically con-
nected to the touch sensor electrode TSE through a vertical
connection contact CNT_V. The vertical connection pattern
CL_V may include an opaque metal material.

Referring to FIG. 7, a first pixel area PA1 and a second
pixel area PA2 may exist around a transparent area TA where
one touch sensor electrode TSE is disposed. Two subpixels
SP may be disposed in the first pixel area PA1, and one
subpixel SP may be disposed in the second pixel area PA2.

For example, two subpixels SP disposed in the first pixel
area PA1 and one subpixel SP disposed in the second pixel
area PA2 may include a red subpixel emitting red light, a
green subpixel emitting green light, and a blue subpixel
emitting blue light.

FIGS. 8 and 9 are cross-sectional views of a touch display
panel 110 according to embodiments of the present disclo-
sure.

Referring to FIGS. 8 and 9, the touch display panel 110
according to the embodiments of the present disclosure may
include a transparent area TA through which light may be
transmitted and a non-transparent area NTA through which
light may not be transmitted. In addition, the non-transparent
area NTA may include a pixel area PA in which a subpixel
SP is disposed.

There may be disposed a light emitting diode LED, a
driving transistor DRT and a storage capacitor Cst included
in the subpixel SP in the pixel area PA. In addition, various
lines may also be disposed in the pixel area PA. Here, the
various lines may include a first power line VDDL, a data
line, and the like.

Referring to FIGS. 8 and 9, the touch display panel 110
according to the embodiments of the present disclosure may
include a substrate SUB, the driving transistor DRT, the light
emitting diode LED, the first power line VDDL, and the like.

The driving transistor DRT may be included in the sub-
pixel SP, and may include an active layer ACT, a source
electrode S, a gate electrode G, and a drain electrode.

The light emitting diode LED may be included in the
subpixel SP, and may include a first electrode E1 and a
second electrode E2.

The first power line VDDL may be a wiring for trans-
mitting a first power signal VDD to the light emitting diode
LED, and may include a reflective metal material.

Referring to FIGS. 8 and 9, the touch display panel 110
according to the embodiments of the present disclosure may
include a first electrode connection pattern CP_E1 electri-
cally connecting the first power line VDDL and the first
electrode E1 of the light emitting diode LED.

The first electrode connection pattern CP_E1 may include
a transparent electrode material disposed within a transpar-
ent electrode layer.

Referring to FIG. 8 and FIG. 9, the touch display panel
110 according to the embodiments of the present disclosure may include a touch sensor electrode TSE included in a touch sensor TS, and a touch routing line TR electrically connected to the touch sensor electrode TSE.

The touch sensor electrode T) may be disposed in a transparent area TA. In this case, the touch sensor electrode TS may include a transparent electrode material. The touch routing line TR may be disposed in a non-transparent area NTA. An area where the touch routing line TR is disposed in the non-transparent area NTA may be an area different from the pixel area PA, or may be an area overlapping with the pixel area PA.

A portion of the touch sensor electrode TS may extend from the transparent area TA to the non-transparent area NTA, and may be be electrically connected to the touch routing line TR disposed in the non-transparent area NTA.

Alternatively, a portion of the touch routing line TR or an electrical pattern connected thereto (e.g., CP_TSE, RP_TS, CP3_TR, CP2_TR, CP1_TR, etc.) may extend from the non-transparent area NTA to the transparent area TA, and may be be electrically connected to the touch sensor electrode TS disposed in the transparent area TA.

Referring to FIGS. 8 and 9, the touch sensor electrode TSE may include a transparent electrode material disposed within a transparent electrode layer. The touch routing line TR may be disposed between the substrate SUB and the touch sensor electrode TSE.

Referring to FIGS. 8 and 9, the touch display panel 110 according to the embodiments of the present disclosure may further include a first display connection pattern RP_S which electrically connects the source electrode or the drain electrode of the driving transistor DRT and the second electrode E2 and includes a reflective metal material.

Referring to FIGS. 8 and 9, the touch display panel 110 according to the embodiments of the present disclosure may further include a storage capacitor Cst including a first capacitor electrode CAPE1 and a second capacitor electrode CAPE2 overlapping with each other.

The first capacitor electrode CAPE1 may be a gate electrode of the driving transistor DRT or a pattern electrically connected to the gate electrode of the driving transistor DRT.

The second capacitor electrode CAPE2 may be a source electrode of the driving transistor DRT or a pattern electrically connected to the source electrode of the driving transistor DRT. The second capacitor electrode CAPE2 may overlap with the first capacitor electrode CAPE1. For example, the second capacitor electrode CAPE2 may overlap with at least a portion of the gate electrode G of the driving transistor DRT.

Referring to FIGS. 8 and 9, the storage capacitor Cst may be disposed on the driving transistor DRT, and may overlap with the driving transistor DRT.

Referring to FIGS. 8 and 9, the storage capacitor Cst may overlap with at least a portion of the active layer of the driving transistor DRT, and may also overlap with at least a portion of the source electrode of the driving transistor DRT.

Referring to FIGS. 8 and 9, the touch display panel 110 according to the embodiments of the present disclosure may further include a light shielding pattern LS disposed between the substrate SUB and the active layer ACT and overlapping with the active layer ACT.

Referring to FIG. 8, in the touch display panel 110 according to the embodiments of the present disclosure, the touch routing line TR may be disposed on the same layer as the light shielding pattern LS.

Referring to FIG. 8, the touch display panel 110 according to the embodiments of the present disclosure may further include a touch connection structure electrically connecting the touch sensor electrode TSE and the touch routing line TR.

Referring to FIG. 8, the touch connection structure included in the touch display panel 110 according to the embodiments of the present disclosure may include a first touch connection pattern RP_TS including a reflective metal material.

Referring to FIG. 8, the touch connection structure included in the touch display panel 110 according to the embodiments of the present disclosure may further include a second touch connection pattern CP1_TR, CP2_TR and CP3_TR disposed within a metal layer in which at least one of a gate electrode, a source electrode, and a drain electrode is disposed.

Referring to FIG. 9, in the touch display panel 110 according to the embodiments of the present disclosure, the touch routing line TR may include a reflective metal material.

Referring to FIG. 9, the touch routing line TR may be disposed on the same layer as the first power line VDDL and the first display connection pattern RP_S.

Referring to FIGS. 8 and 9, it will be described a vertical stacking structure for a touch display panel 110 according to embodiments of the present disclosure.

The light shielding pattern LS may be disposed on the substrate SUB.

A buffer layer BUF may be disposed on the light shielding pattern LS. The buffer layer BUF may be made of an insulating material. For example, the buffer layer BUF may be configured as a single layer or multilayer made of at least one of silicon nitride (SiNx), silicon oxide (SiOx), and silicon oxynitride (SiON). For example, the buffer layer BUF may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto. However, the buffer layer BUF may be excluded in accordance with the structure or properties of the display device.

The active layer ACT may be disposed on the buffer layer BUF.

A gate insulating film GI may be disposed on the active layer ACT. The active layer ACT may overlap with the entirety or a portion of the light shielding pattern LS.

The gate insulating film GI may be configured as a single layer or multilayer made of silicon nitride (SiNx) or silicon oxide (SiOx). For example, the gate insulating film GI may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto.

The gate electrode G of a driving transistor DRT may be disposed on the gate insulating film GI. The gate electrode G may overlap with a portion of the active layer ACT. The gate electrode G may correspond to the first capacitor electrode CAPE1 of the storage capacitor Cst.

A first interlayer insulating film ILD1 may be disposed on the gate electrode G.

The first interlayer insulating film ILD1 may be configured as a single layer or multilayer made of silicon nitride (SiNx) or silicon oxide (SiOx). For example, the first interlayer insulating film ILD1 may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto.

A second capacitor electrode CAPE2 may be disposed on the first interlayer insulating film ILD1. The second capacitor electrode CAPE2 may overlap with the first capacitor electrode CAPE1. The first capacitor electrode CAPE1 and the second capacitor electrode CAPE2 may form a storage capacitor Cst.

A second interlayer insulating film ILD2 may be disposed on the second capacitor electrode CAPE2.

The second interlayer insulating film ILD2 may be configured as a single layer or multilayer made of silicon nitride (SiNx) or silicon oxide (SiOx). For example, the second interlayer insulating film ILD2 may be formed by inorganic film in a single layer or in multiple layers, for example, the inorganic film in a single layer may be a silicon oxide (SiOx) film or a silicon nitride (SiNx) film, and inorganic films in multiple layers may formed by alternately stacking one or more silicon oxide (SiOx) films, one or more silicon nitride (SiNx) films, and one or more amorphous silicon (a-Si), but the present disclosure is not limited thereto.

A source electrode S may be disposed on the second interlayer insulating film ILD2. A drain electrode may also be disposed on the second interlayer insulating film ILD2.

Referring to the equivalent circuit of the subpixel SP of FIG. 2, the source electrode S corresponding to the source node Ns of the driving transistor DRT may be electrically connected to one of the two capacitor electrodes CAPE1 and CAPE2 included in the storage capacitor Cst, and may be electrically connected to the second electrode E2 of the light emitting diode LED.

Referring to FIGS. 8 and 9, a part of the source electrode S of the driving transistor DRT may be connected to a part of the active layer ACT through a contact hole of the second interlayer insulating film ILD2, the first interlayer insulating film ILD1, and the gate insulating film GI.

In addition, another part of the source electrode S of the driving transistor DRT may be connected to the second capacitor electrode CAPE2 through a contact hole of the second interlayer insulating film ILD2.

Referring to FIGS. 8 and 9, another part of the source electrode S of the driving transistor DRT may be electrically connected to the light shielding pattern LS.

For example, the light shielding connection pattern CP_L may be disposed on the same layer as the gate electrode G. Another part of the source electrode S of the driving transistor DRT may be electrically connected to the light shielding pattern LS through a light-shielding connection pattern CP_L.

Referring to FIGS. 8 and 9, another part of the source electrode S of the driving transistor DRT may be connected to the light-shielding connection pattern CP_L through a contact hole of the second interlayer insulating film ILD2 and the first interlayer insulating film ILD1, and the light-shielding connection pattern CP_L may be connected to the light shielding pattern LS through a contact hole of the gate insulating film GI and the buffer layer BUF.

Referring to FIGS. 8 and 9, a first passivation layer PAS1 may be disposed on the source electrode S of the driving transistor DRT.

Referring to FIGS. 8 and 9, a source-drain pattern CP_S may be disposed on the first passivation layer PAS1, and the source-drain pattern CP_S may be connected to the source electrode S through a contact hole of the first passivation layer PAS1.

Referring to FIGS. 8 and 9, a second passivation layer PAS2 may be disposed on the source-drain pattern CP_S.

Referring to FIGS. 8 and 9, a first insulating layer PAC1 may be disposed on a second passivation layer PAS2, and a first display connection pattern RP_S may be disposed on the first insulating layer PAC1. For example, the first insulating layer PAC1 may be a photo acrylic layer.

Referring to FIGS. 8 and 9, the first display connection pattern RP_S may be connected to the source-drain pattern CP_S through a contact hole of the first insulating layer PAC1 and the second passivation layer PAS2.

Referring to FIGS. 8 and 9, a first power line VDDL may be disposed on the same layer as the first display connection pattern RP_S. The first display connection pattern RP_S and the first power line VDDL may be disposed on the same layer, and may include a reflective metal material.

Referring to FIGS. 8 and 9, a third passivation layer PAS3 may be disposed on the first display connection pattern RP_S and the first power line VDDL, and a support layer INS may be disposed on the third passivation layer PAS3.

Referring to FIGS. 8 and 9, a light emitting diode LED including a first electrode E1 and a second electrode E2 may be disposed on the support layer INS. A second electrode connection pattern CP_E2 electrically connecting the second electrode E2 and the first display connection pattern RP_S may be disposed on an upper portion of the support layer INS. One end of the second electrode connection pattern CP_E2 may be connected to the first display connection pattern RP_S through a contact hole of the support layer INS, and the other end of the second electrode connection pattern CP_E2 may be connected to the second electrode E2 of the light emitting diode LED.

Referring to FIGS. 8 and 9, a first power connection pattern CP_VDDL may be disposed on the support layer INS, and the first power connection pattern CP_VDDL may be connected to the first power line VDDL through a contact hole of the support layer INS and the third passivation layer PAS3.

Referring to FIGS. 8 and 9, a second insulating layer PAC2 may be arranged on the second electrode connection pattern CP_E2.

Referring to FIGS. 8 and 9, a third insulating layer PAC3 may be disposed on the second insulating layer PAC2 and the light emitting diode LED. A first electrode connection pattern CP_E1 may be disposed on the third insulating layer PAC3.

Referring to FIGS. 8 and 9, the first electrode connection pattern CP_E1 may be connected to the first power connection pattern CP_VDDL through a contact hole of the third insulating layer PAC3 and the second insulating layer PAC2.

The touch sensor structure illustrated in FIG. 8 is a structure in which the touch routing line TR is disposed on the same layer as the light shielding pattern LS. However, the present disclosure is not limited thereto, the touch routing line TR may be disposed on a different layer from the light shielding pattern LS.

Referring to FIG. 8, the touch sensor electrode TSE may be disposed on the same layer as the first electrode connection pattern CP_E1, and may include a transparent electrode material.

A touch connection structure electrically connecting the touch sensor electrode TSE and the touch routing line TR may be disposed between the touch sensor electrode TSE and the touch routing line TR.

Referring to FIG. 8, the touch connection structure in the touch display panel 110 according to the embodiments of the present disclosure may include a touch connection pattern CP1_TR including a gate electrode material, a touch connection pattern CP2_TR including a first source-drain electrode material constituting a source electrode S, a touch connection pattern CP3_TR including a second source-drain electrode material constituting a source-drain pattern CP_S, a touch connection pattern RP_TS including a reflective electrode material identical to the first display connection pattern RP_S and the first power line VDDL, and a touch connection pattern CP_TSE including the same metal as the second electrode connection pattern CP_E2.

The touch sensor structure illustrated in FIG. 9 is a structure in which the touch routing line TR includes the same reflective electrode material as the first display connection pattern RP_S and the first power line VDDL. However, the present disclosure is not limited thereto, the touch routing line TR may include a different material from the first display connection pattern RP_S and the first power line VDDL.

Referring to FIG. 9, the touch sensor electrode TSE may be disposed on the same layer as the first electrode connection pattern CP_E1, and may include a transparent electrode material.

Between the touch sensor electrode TSE and the touch routing line TR, there may be disposed a touch connection structure electrically connecting the touch sensor electrode TSE and the touch routing line TR.

Referring to FIG. 9, the touch connection structure in the touch display panel 110 according to the embodiments of the present disclosure may include a touch connection pattern CP_TSE including the same metal as the second electrode connection pattern CP_E2. However, the present disclosure is not limited thereto, the touch connection pattern CP_TSE may include a different metal from the second electrode connection pattern CP_E2.

Referring to FIGS. 8 and 9, a touch display panel 110 included in a light emitting diode display device 100 with a built-in touch sensor according to embodiments of the present disclosure may include a substrate SUB, a touch sensor TS including a plurality of touch sensor electrodes TSE electrically connected to each other and including a transparent electrode material, a light emitting diode LED including a first electrode E1 and a second electrode E2, and a driving transistor DRT including an active layer, a source electrode, a gate electrode and a drain electrode. The exemplary embodiments of the present disclosure are not limited thereto. Meanwhile, all the components of each light emitting diode display device according to all embodiments of the present disclosure are operatively coupled and configured.

Referring to FIGS. 8 and 9, in a touch display panel 110 included in a light emitting diode display device 100 with a built-in touch sensor according to embodiments of the present disclosure, the touch sensor TS may include a horizontal connection pattern CL_H connecting a plurality of touch sensor electrodes TSE in a horizontal direction, and a vertical connection pattern CL_V connecting a plurality of touch sensor electrodes TSE in a vertical direction.

The horizontal connection pattern CL_H may include a transparent electrode material, and the vertical connection pattern CL_V may include an opaque metal material.

The horizontal connection pattern CL_H may be located at an upper layer closer to the viewing surface than the vertical connection pattern CL_V.

The horizontal connection pattern CL_H may include a transparent electrode material, thereby minimizing a decrease in transmittance. The transparent electrode material may be a high resistance material. The vertical connection pattern CL_V may include an opaque metal material having a relatively lower resistance than the transparent electrode material, thereby having a resistance reduction effect.

Referring to FIGS. 8 and 9, in the touch display panel 110 included in the light emitting diode display device 100 with a built-in touch sensor according to embodiments of the present disclosure, there may be further included a storage capacitor Cst disposed on a driving transistor DRT.

Referring to FIGS. 8 and 9, the light emitting diode display device 100 with a built-in touch sensor according to embodiments of the present disclosure may further include a touch driving circuit 160 for supplying a touch driving signal to the touch sensor TS, and a touch routing line TR for connecting the touch sensor TS and the touch driving circuit 160.

Referring to FIGS. 8 and 9, in the light emitting diode display device 100 with a built-in touch sensor according to embodiments of the present disclosure, the touch routing line TR may be disposed between the substrate SUB and the touch sensor electrode TSE.

Referring to FIGS. 8 and 9, the light emitting diode display device 100 with a built-in touch sensor according to embodiments of the present disclosure may include a transparent area TA in which the touch sensor electrode TSE is disposed, and a pixel area PA1 and PA2 in which the light emitting diode LED is disposed.

FIGS. 10 and 11 illustrate driving timing diagrams of a light emitting diode display device with a built-in touch sensor 100 according to embodiments of the present disclosure.

FIG. 10 is a driving timing diagram for a case where a light emitting diode display device 100 with a built-in touch sensor according to embodiments of the present disclosure performs touch driving in a display hold driving manner.

Referring to FIG. 10, when the light emitting diode display device 100 with a built-in touch sensor according to embodiments of the present disclosure performs touch driving in a display hold driving manner, a display driving period Td and a display hold period Th may be time-divided, and touch driving may be performed during the display hold period Th.

Referring to FIG. 10, a driving period of the light emitting diode display device 100 with a built-in touch sensor may include a display driving period Td and a display hold period Th, and during the display hold period Th, a touch driving signal may be applied to a touch sensor electrode TSE. Here, the touch driving signal may be a signal whose voltage level varies with time.

As shown in FIG. 10, if the light emitting diode display device 100 with a built-in touch sensor according to the embodiments of the present disclosure performs touch driving in a display hold driving manner, as shown in FIG. 8, the touch routing line TR may be composed of a metal located at the lowest position in the touch display panel 110. For example, the metal located at the lowest position in the touch display panel 110 may include a light shielding pattern LS.

If the touch routing line TR is composed of a metal located at the lowest position in the touch display panel 110, there may be small the influence between the touch driving and the display driving (in particular, a display-to-touch crosstalk DTA as the influence of the display driving on the touch driving). Therefore, there may be possible for the touch driving and the display driving to be performed in a time-division manner.

FIG. 11 is a driving timing diagram for a case where a light emitting diode display device 100 according to embodiments of the present disclosure performs touch driving in a display off driving manner.

Referring to FIG. 11, in the case that a light emitting diode display device 100 with a built-in touch sensor according to embodiments of the present disclosure performs touch driving in a display off driving manner, when a display driving period DISPLAY ends, touch driving may be performed during a display off period in which the display is ended.

As shown in FIG. 11, in the case that a light emitting diode display device 100 with a built-in touch sensor according to embodiments of the present disclosure performs touch driving in a display off driving manner, as illustrated in FIG. 9, a touch routing line TR may be formed of a metal located close to an electrode or metal (e.g., a first display connection pattern RP_S) related to display driving in a touch display panel 110. For example, the metal located close to an electrode or metal related to display driving of the touch display panel 110 may include the first display connection pattern RP_S.

If the touch routing line TR is composed of a metal located close to an electrode or metal (e.g., the first display connection pattern RP_S) related to display driving of the touch display panel 110, the influence between the touch driving and the display driving (in particular, there may be great an influence between the touch driving and the display driving (in particular, a display-to-touch crosstalk DTX as the influence of the display driving on the touch driving). Therefore, the touch driving is performed during the display off period when the display driving ends.

Referring to FIG. 11, when the light emitting diode display device 100 with a built-in touch sensor is in the display off state, a touch driving signal may be applied to the touch sensor electrode TSE.

As described above, according to exemplary embodiments of the present disclosure, when the touch routing line TR is composed of a metal located at the lowest position in the touch display panel 110, there may be possible for the touch driving and the display driving to be performed in a time-division manner; alternatively, when the touch routing line TR is composed of a metal located close to an electrode or metal related to display driving of the touch display panel 110, the touch driving may be performed during the display off period when the display driving ends. However, the present disclosure is not limited thereto.

The the light emitting diode display device 100 with a built-in touch sensor according to the embodiments of the present disclosure described above may be a general monitor or television, or a mobile terminal such as a smart phone or tablet.

Alternatively, the the light emitting diode display device 100 with a built-in touch sensor according to the embodiments of the present disclosure may be a vehicle display device installed in a vehicle.

Embodiments of the present disclosure described above are briefly described as follows.

A light emitting diode display device with a built-in touch sensor according to the embodiments of the present disclosure may include a substrate, a driving transistor included in a subpixel, and including an active layer, a source electrode, a gate electrode and a drain electrode, a light emitting diode included in the subpixel, and including a first electrode and a second electrode, a driving voltage line including a reflective metal material, a first electrode connection pattern electrically connecting the driving voltage line and the first electrode, and including a transparent electrode material, a touch sensor electrode including the transparent electrode material, and a touch routing line electrically connected to the touch sensor electrode and disposed between the substrate and the touch sensor electrode.

The display device with a built-in touch sensor according to the exemplary embodiments of the present disclosure may further include a driving transistor included in a subpixel, and including an active layer, a source electrode, a gate electrode and a drain electrode.

The light emitting diode display device with a built-in touch sensor according to the embodiments of the present disclosure may further include a support layer disposed on the driving voltage line, and an insulating layer (e.g., third insulation layer PAC3 of FIGS. 8 and 9) on the support layer.

The light emitting diode may be disposed between the support layer and the insulating layer.

The first electrode connection pattern may be disposed on the insulating layer. One end of the first electrode connection pattern may be electrically connected to the first electrode through a contact hole of the insulating layer, and the other end of the first electrode connection pattern may be electrically connected to the driving voltage line through another contact hole of the insulating layer.

The touch sensor electrode may be disposed on the insulating layer.

The touch routing line may be disposed below the support layer.

The touch sensor electrode may be electrically connected to the touch routing line through a contact hole of the insulating layer and the support layer.

The light emitting diode display device with a built-in touch sensor according to the embodiments of the present disclosure may further include a first display connection pattern electrically connecting the source electrode or the drain electrode to the second electrode, and including the reflective metal material.

The light emitting diode display device with a built-in touch sensor according to the embodiments of the present disclosure may further include a storage capacitor including a first capacitor electrode and a second capacitor electrode overlapping with each other.

The first capacitor electrode may be a pattern electrically connected to the gate electrode, and the second capacitor electrode may be a pattern electrically connected to the source electrode.

The storage capacitor may be disposed on the driving transistor.

The storage capacitor may overlap with at least a portion of the active layer, and overlap with at least a portion of the source electrode.

The light emitting diode display device with a built-in touch sensor according to the embodiments of the present disclosure may further include a light shielding pattern disposed between the substrate and the active layer, and overlapping with the active layer In the light emitting diode display device with a built-in touch sensor according to the embodiments of the present disclosure, the touch routing line may be disposed on the same layer as the light shielding pattern.

The light emitting diode display device with a built-in touch sensor according to the embodiments of the present disclosure may further include a touch connection structure electrically connecting the touch sensor electrode and the touch routing line.

In the light emitting diode display device with a built-in touch sensor according to the embodiments of the present disclosure, the touch connection structure may include a first touch connection pattern including the reflective metal material.

The display device with a built-in touch sensor according to the exemplary embodiments of the present disclosure, further comprises a second electrode connection pattern electrically connecting the second electrode and the first display connection pattern.

In the light emitting diode display device with a built-in touch sensor according to the embodiments of the present disclosure, the touch connection structure may further include a second touch connection pattern disposed within a metal layer in which at least one of the gate electrode, the source electrode and the drain electrode is disposed.

In the display device with a built-in touch sensor according to the exemplary embodiments of the present disclosure, the touch connection structure further includes a third touch connection pattern connecting the first touch connection pattern with the touch sensor electrode.

The display device with a built-in touch sensor according to the exemplary embodiments of the present disclosure, further comprises a second electrode connection pattern electrically connecting the second electrode, and wherein the third touch connection pattern is form on a same layer as the second electrode connection pattern with a same metal.

A driving period of the light emitting diode display device with a built-in touch sensor according to the embodiments of the present disclosure may include a display driving period and a display hold period. A touch driving signal may be applied to the touch sensor electrode during the display hold period.

In the light emitting diode display device with a built-in touch sensor according to the embodiments of the present disclosure, the touch routing line may include the reflective metal material.

A touch driving signal may be applied to the touch sensor electrode when the light emitting diode display device with a built-in touch sensor according to the embodiments of the present disclosure is in a display off state.

The light emitting diode display device with a built-in touch sensor according to the embodiments of the present disclosure may include a transparent area through which light is transmitted, and a non-transparent area different from the transparent area.

The touch sensor electrode may be disposed in the transparent area.

The non-transparent area may include a pixel area in which the light emitting diode and the driving transistor are disposed.

The touch routing line may be disposed in the non-transparent area.

An area where the touch routing line is disposed in the non-transparent area may be an area different from the pixel area or an area overlapping with the pixel area.

A part of the touch sensor electrode may extend from the transparent area to the non-transparent area, and may be electrically connected to the touch routing line disposed in the non-transparent area.

Alternatively, a part of the touch routing line or an electrical pattern connected to the touch routing line may extend from the non-transparent area to the transparent area, and may be electrically connected to the touch sensor electrode disposed in the transparent area.

In the light emitting diode display device with a built-in touch sensor according to the embodiments of the present disclosure, each subpixel may further include a first scan transistor controlling a connection between the gate electrode of the driving transistor and a data line, a second scan transistor controlling a connection between the second electrode of the light emitting diode and a reference voltage line, and a storage capacitor connected between the second electrode of the light emitting diode and the gate electrode of the driving transistor.

The light emitting diode display device with a built-in touch sensor according to the embodiments of the present disclosure may include a plurality of first touch sensors and a plurality of second touch sensors.

The plurality of first touch sensors may be arranged in a matrix form.

The first touch sensors disposed in the same row among the plurality of first touch sensors may be electrically connected.

Each of the plurality of first touch sensors may be configured in a mesh form including a plurality of touch sensor electrodes connected to each other.

In the light emitting diode display device with a built-in touch sensor according to the embodiments of the present disclosure, the first touch sensors disposed in the same row among the plurality of first touch sensors may be electrically connected to form a transmitting touch sensor line or a receiving touch sensor line.

Each of the plurality of second touch sensors may form the receiving touch sensor line or the transmitting touch sensor line.

The light emitting diode display device with a built-in touch sensor according to the embodiments of the present disclosure may be installed in a vehicle.

A light emitting diode display device with a built-in touch sensor according to the embodiments of the present disclosure may include a substrate, a touch sensor including a plurality of touch sensor electrodes electrically connected to each other, and including a transparent electrode material, a light emitting diode including a first electrode and a second electrode, and a driving transistor including an active layer, a source electrode, a gate electrode and a drain electrode.

The display device with a built-in touch sensor according to the exemplary embodiments of the present disclosure may further include and a driving transistor including an active layer, a source electrode, a gate electrode and a drain electrode.

The touch sensor may include a horizontal connection pattern connecting the plurality of touch sensor electrodes in a horizontal direction and including the transparent electrode material, and a vertical connection pattern connecting the plurality of touch sensor electrodes in a vertical direction and including an opaque metal material.

The light emitting diode display device with a built-in touch sensor according to the embodiments of the present disclosure may further include a storage capacitor disposed on the driving transistor The light emitting diode display device with a built-in touch sensor according to the embodiments of the present disclosure may further include a touch driving circuit for supplying a touch driving signal to a touch sensor, and a touch routing line for connection between the touch sensor and the touch driving circuit.

The touch routing line may be disposed between the substrate and the plurality of touch sensor electrodes.

The light emitting diode display device with a built-in touch sensor according to the embodiments of the present disclosure may further include a transparent area where the plurality of touch sensor electrodes are disposed, and a pixel area where the light emitting diode is disposed.

In a light emitting diode display device with a built-in touch sensor according to embodiments of the present disclosure, the touch routing lines may be connected to a pad unit across a display area without bypassing a non-display area. According to this touch routing structure, it is possible to reduce the size of the non-display area (e.g., bezel).

A display device according to the exemplary embodiments of the present disclosure may include a substrate divided into a pixel area and a non-pixel area, a light emitting diode on the substrate in the pixel area and including a first electrode and a second electrode, a touch sensor electrode on the substrate in the non-pixel area and including the transparent electrode material, and a touch routing line electrically connected to the touch sensor electrode and disposed between the substrate and the touch sensor electrode.

The display device may further include a driving voltage line including a reflective metal material, and a first electrode connection pattern electrically connecting the driving voltage line and the first electrode, and including a transparent electrode material.

The pixel area may be disposed as a non-transparent area, and the non-pixel area may be disposed to include a transparent area and a portion of a non-transparent area.

According to embodiments of the present disclosure, it is possible to provide a light emitting diode display device with a built-in touch sensor.

According to embodiments of the present disclosure, it is possible to provide a light emitting diode display device with a built-in touch sensor capable of transparent display.

According to embodiments of the present disclosure, it is possible to provide a light emitting diode display device with a built-in touch sensor installed in a vehicle.

According to embodiments of the present disclosure, it is possible to provide a light emitting diode display device with a built-in touch sensor capable of minimizing transmittance degradation.

According to embodiments of the present disclosure, it is possible to provide a light emitting diode display device with a built-in touch sensor which enables bezel reduction since the touch routing lines are connected to a pad unit across a display area without bypassing a non-display area.

According to embodiments of the present disclosure, it is possible to provide a light emitting diode display device with a built-in touch sensor which is easy to manufacture and may be reduced in weight by having a simple vertical structure.

According to embodiments of the present disclosure, it is possible to provide a light emitting diode display device with a built-in touch sensor having an arrangement structure of touch routing lines capable of reducing an influence between display driving and touch driving.

According to embodiments of the present disclosure, it is possible to provide a light emitting diode display device with a built-in touch sensor for performing touch driving capable of reducing an influence between display driving and touch driving.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

What is claimed is:

1. A light emitting diode display device with a built-in touch sensor comprising:
   a substrate;
   a driving transistor included in a subpixel, the driving transistor including an active layer, a source electrode, a gate electrode, and a drain electrode;
   a light emitting diode included in the subpixel, the light emitting diode including a first electrode and a second electrode;
   a driving voltage line including a reflective metal material;
   a first electrode connection pattern electrically connecting the driving voltage line and the first electrode, the first electrode connection pattern including a transparent electrode material;
   a touch sensor electrode including the transparent electrode material; and
   a touch routing line electrically connected to the touch sensor electrode, the touch routing line between the substrate and the touch sensor electrode,
   wherein the first electrode connection pattern is disposed in a same layer as the touch sensor electrode.

2. The light emitting diode display device with a built-in touch sensor of claim 1, further comprising:
   a support layer on the driving voltage line; and
   an insulating layer on the support layer,
   wherein the light emitting diode is between the support layer and the insulating layer, and the first electrode connection pattern is on the insulating layer,
   wherein one end of the first electrode connection pattern is electrically connected to the first electrode through a contact hole of the insulating layer, and another end of the first electrode connection pattern is electrically connected to the driving voltage line through another contact hole of the insulating layer,
   wherein the touch sensor electrode is on the insulating layer, and the touch routing line is below the support layer,
   wherein the touch sensor electrode is electrically connected to the touch routing line through a contact hole of the insulating layer and the support layer.

3. The light emitting diode display device with a built-in touch sensor of claim 1, further comprising:
   a first display connection pattern electrically connecting the source electrode or the drain electrode to the second electrode, the first display connection pattern including the reflective metal material.

4. The light emitting diode display device with a built-in touch sensor of claim 1, further comprising:
   a storage capacitor including a first capacitor electrode and a second capacitor electrode overlapping with each other,
   wherein the first capacitor electrode is a pattern electrically connected to the gate electrode, and the second capacitor electrode is a pattern electrically connected to the source electrode,
   wherein the storage capacitor is on the driving transistor.

5. The light emitting diode display device with a built-in touch sensor of claim 4, wherein the storage capacitor overlaps with at least a portion of the active layer, and overlaps with at least a portion of the source electrode.

6. The light emitting diode display device with a built-in touch sensor of claim 1, further comprising:

a light shielding pattern between the substrate and the active layer, and overlapping with the active layer.

7. The light emitting diode display device with a built-in touch sensor of claim 6, wherein the touch routing line is on a same layer as the light shielding pattern.

8. The light emitting diode display device with a built-in touch sensor of claim 7, further comprising:

a touch connection structure electrically connecting the touch sensor electrode and the touch routing line, the touch connection structure including a first touch connection pattern comprising the reflective metal material.

9. The light emitting diode display device with a built-in touch sensor of claim 8, wherein the touch connection structure further includes a second touch connection pattern within a metal layer in which at least one of the gate electrode, the source electrode and the drain electrode is disposed.

10. The light emitting diode display device with a built-in touch sensor of claim 1, wherein the touch routing line includes the reflective metal material.

11. The light emitting diode display device with a built-in touch sensor of claim 1, further comprising:

a transparent area through which light is transmitted; and a non-transparent area that is different from the transparent area, wherein the touch sensor electrode is in the transparent area, wherein the non-transparent area includes a pixel area in which the light emitting diode and the driving transistor are disposed.

12. The light emitting diode display device with a built-in touch sensor of claim 11, wherein the touch routing line is in the non-transparent area, wherein an area where the touch routing line is disposed in the non-transparent area is an area that is different from the pixel area or an area overlapping with the pixel area, wherein a part of the touch sensor electrode extends from the transparent area to the non-transparent area and is electrically connected to the touch routing line disposed in the non-transparent area, or a part of the touch routing line or an electrical pattern connected to the touch routing line extends from the non-transparent area to the transparent area and is electrically connected to the touch sensor electrode disposed in the transparent area.

13. The light emitting diode display device with a built-in touch sensor of claim 1, further comprising:

a plurality of first touch sensors and a plurality of second touch sensors, wherein the plurality of first touch sensors are arranged in a matrix form, wherein first touch sensors among the plurality of first touch sensors that are in a same row are electrically connected, wherein each of the plurality of first touch sensors is configured in a mesh form including a plurality of touch sensor electrodes connected to each other.

14. The light emitting diode display device with a built-in touch sensor of claim 13, wherein the first touch sensors that are in the same row are electrically connected and form a transmitting touch sensor line or a receiving touch sensor line, wherein each of the plurality of second touch sensors forms the receiving touch sensor line or the transmitting touch sensor line.

15. A light emitting diode display device with a built-in touch sensor comprising:

a substrate;

a touch sensor including a plurality of touch sensor electrodes electrically connected to each other, the touch sensor including a transparent electrode material;

a light emitting diode including a first electrode and a second electrode;

a driving transistor including an active layer, a source electrode, a gate electrode, and a drain electrode; and a first electrode connection pattern electrically connecting a driving voltage line and the first electrode, the first electrode connection pattern including a transparent electrode material, wherein the touch sensor comprises a horizontal connection pattern connecting the plurality of touch sensor electrodes in a horizontal direction and including the transparent electrode material, and a vertical connection pattern connecting the plurality of touch sensor electrodes in a vertical direction and including an opaque metal material, and wherein the first electrode connection pattern is disposed in a same layer as at least one touch sensor electrode among the plurality of touch sensor electrodes, and disposed on the light emitting diode.

16. The light emitting diode display device with a built-in touch sensor of claim 15, wherein the horizontal connection pattern is located on the vertical connection pattern.

17. The light emitting diode display device with a built-in touch sensor of claim 15, further comprising:

a transparent area where the plurality of touch sensor electrodes are disposed; and a pixel area where the light emitting diode is disposed.

18. A display device comprising:

a substrate divided into a pixel area and a non-pixel area;

a light emitting diode on the substrate in the pixel area and including a first electrode and a second electrode;

a touch sensor electrode on the substrate in the non-pixel area and including a transparent electrode material;

a touch routing line electrically connected to the touch sensor electrode and disposed between the substrate and the touch sensor electrode; and a first electrode connection pattern electrically connecting a driving voltage line and the first electrode, and including a transparent electrode material, wherein the first electrode connection pattern is disposed in a same layer as the touch sensor electrode.

19. The display device of claim 18, further comprising:

the driving voltage line including a reflective metal material.

20. The display device of claim 18, wherein the pixel area is disposed as a non-transparent area, and wherein the non-pixel area is disposed to include a transparent area and a portion of a non-transparent area.

* * * * *